United States Patent
Hotary et al.

(10) Patent No.: US 12,522,326 B2
(45) Date of Patent: Jan. 13, 2026

(54) ENERGY HARVESTING VESSELS WITH MODULAR HULLS

(71) Applicant: LILYPAD LABS, INC., Holland, MI (US)

(72) Inventors: James T. Hotary, Holland, MI (US); Rodger W. Eich, Holland, MI (US)

(73) Assignee: LILYPAD LABS, INC., Holland, MI (US)

(*) Notice: Subject to any disclaimer, the term of this patent is extended or adjusted under 35 U.S.C. 154(b) by 662 days.

(21) Appl. No.: 17/871,330

(22) Filed: Jul. 22, 2022

(65) Prior Publication Data

US 2023/0028155 A1   Jan. 26, 2023

Related U.S. Application Data

(60) Provisional application No. 63/224,821, filed on Jul. 22, 2021.

(51) Int. Cl.
*B63B 35/44* (2006.01)
*B63B 1/12* (2006.01)
(Continued)

(52) U.S. Cl.
CPC .............. *B63B 35/44* (2013.01); *B63B 1/121* (2013.01); *B63B 7/02* (2013.01); *B63B 34/00* (2020.02);
(Continued)

(58) Field of Classification Search
CPC ... B63B 1/121; B63B 2001/123; B63B 1/125; B63B 2001/126; B63B 2001/128;
(Continued)

(56) References Cited

U.S. PATENT DOCUMENTS

| 6,302,043 B1 * | 10/2001 | Wippermann ......... B63H 16/12 114/66 |
| 8,061,290 B2 | 11/2011 | de Waal |

(Continued)

FOREIGN PATENT DOCUMENTS

| EP | 3617055 A1 | 3/2020 |
| JP | 3093339 U | 5/2003 |

(Continued)

*Primary Examiner* — Ajay Vasudeva
(74) *Attorney, Agent, or Firm* — Aurora Consulting LLC; Ashley Sloat; Albert Du

(57) ABSTRACT

Described herein are watercraft comprising a hull comprising a first hull assembly, and a second hull assembly opposite the first hull assembly and parallel to the first hull assembly; and a frame configured to couple the first hull assembly to the second hull assembly. In some embodiments, the first hull assembly comprises a first quarter hull coupled to a second quarter hull, and the second hull assembly comprises a third quarter hull coupled to a fourth quarter hull. In some embodiments, the first and third quarter hulls are substantially reflectively duplicative of the second and fourth quarter hulls. In some embodiments, the first hull assembly is substantially reflectively symmetrical to the second hull assembly. Various embodiments may further include a roof comprising one or more energy harvesting arrays thereon. The roof may be movable, in various embodiments, between a closed configuration and an open configuration.

20 Claims, 28 Drawing Sheets

(51) Int. Cl.
*B63B 7/02* (2020.01)
*B63B 17/02* (2006.01)
*B63B 34/00* (2020.01)
*B63H 20/00* (2006.01)
*B63H 21/21* (2006.01)
*B63J 3/00* (2006.01)

(52) U.S. Cl.
CPC ........ *B63H 21/21* (2013.01); *B63B 2001/123* (2013.01); *B63B 2017/026* (2013.01); *B63B 2035/4433* (2013.01); *B63B 2035/4453* (2013.01); *B63H 2020/003* (2013.01); *B63H 2021/216* (2013.01); *B63J 2003/003* (2013.01)

(58) Field of Classification Search
CPC ... B63B 17/02; B63B 2017/026; B63B 35/34; B63B 35/36; B63B 35/38; B63B 35/44; B63B 2035/4433; B63B 2035/4453; B63B 2209/18; B63H 21/17; B63H 2021/171; B63J 2003/003
See application file for complete search history.

(56) References Cited

U.S. PATENT DOCUMENTS

| | | | |
|---|---|---|---|
| 8,656,856 B1* | 2/2014 | Morrow | B63B 34/10 |
| | | | 114/61.1 |
| 9,090,321 B1* | 7/2015 | Casperson | B63H 5/08 |
| 10,875,608 B2* | 12/2020 | Borton | H02K 11/0094 |
| 11,807,345 B2* | 11/2023 | Neidert | B63B 7/02 |
| 2006/0231010 A1* | 10/2006 | Baylor | B63B 17/02 |
| | | | 114/361 |
| 2021/0214058 A1* | 7/2021 | Hine | H02S 20/30 |
| 2022/0224279 A1* | 7/2022 | Zimmermann | B63B 73/10 |

FOREIGN PATENT DOCUMENTS

| | | | | |
|---|---|---|---|---|
| KR | 101701459 B1 * | 2/2017 | ............ | Y02E 10/50 |
| WO | 2008064695 A1 | 6/2008 | | |

* cited by examiner

ENERGY HARVESTING VESSELS WITH MODULAR HULLS

CROSS-REFERENCE TO RELATED APPLICATIONS

This application claims the priority benefit of U.S. Provisional Patent Application Ser. No. 63/224,821, filed Jul. 22, 2021, the contents of which are herein incorporated by reference in their entirety.

INCORPORATION BY REFERENCE

All publications and patent applications mentioned in this specification are herein incorporated by reference in their entirety, as if each individual publication or patent application was specifically and individually indicated to be incorporated by reference in its entirety.

TECHNICAL FIELD

This disclosure relates generally to the field of watercraft, and more specifically to the field of energy harvesting recreational boats, where ease of use, safety, silent operation, and environmental sustainability is valued. More particularly, the present disclosure relates to a series of design details which enable easy use, data connectivity, improved experience, and shared operation. Described herein are systems and methods for a self-charging marine platform.

BACKGROUND

Although electric powered ships, boats, and the like have been known for many years, the safe use, storage, maintenance, transportation, and launching of these vessels has required considerable skill, effort, patience, and cost. The most easy-to-use designs available today still require significant effort to ready a boat for use, often requiring multiple people and special equipment. Furthermore, if the boat is powered by an electric propulsion system, the additional effort required to charge, including the cost of electric grid infrastructure, can be significant. Accordingly, there is a need for safe, sustainable, and portable vessels.

SUMMARY OF THE INVENTION

The present invention is a sustainably powered, automatically battery charging, wirelessly connected, and electrically driven watercraft that integrates a mechanism for easy covering and security after use.

One aspect of the present disclosure is directed to a watercraft comprising a hull. In some embodiments, the hull includes a first hull assembly, and a second hull assembly opposite the first hull assembly and parallel to the first hull assembly; and a frame configured to couple the first hull assembly to the second hull assembly.

In any of the preceding embodiments, the first hull assembly comprises a first quarter hull coupled to a second quarter hull, and the second hull assembly comprises a third quarter hull coupled to a fourth quarter hull.

In any of the preceding embodiments, the first and third quarter hulls are substantially reflectively duplicative of the second and fourth quarter hulls.

In any of the preceding embodiments, the first hull assembly is substantially reflectively symmetrical to the second hull assembly.

In some embodiments, the vessel further includes a rail system coupled to a top portion of the hull; and a roof configured to slide along the rail system coupled to the hull.

In any of the preceding embodiments, the roof is configured to slide between a closed configuration in which the interior is inaccessible and an open configuration in which the interior is accessible.

In any of the preceding embodiments, each of the first quarter hull, the second quarter hull, the third quarter hull, and the fourth quarter hull comprise an individually sealed buoyancy chamber.

In any of the preceding embodiments, the roof comprises one or more energy harvesting arrays configured as a power recharging source for the watercraft.

In any of the preceding embodiments, the vessel further includes a propulsion unit coupled to the hull.

In any of the preceding embodiments, the vessel further includes a controller configured to accept inputs and respond with directional and power influences on the propulsion unit.

In any of the preceding embodiments, the hull defines an interior, such that the interior includes one or more seats configured to move between a stowed position when the roof is in the closed configuration and a use position when the roof is in the open configuration.

Another aspect of the present disclosure is directed to a watercraft comprising a hull comprising four quarter hull sections, each configured as a self-contained buoyancy chamber; a frame configured to couple the four quarter hull sections together; a rail system coupled to a top portion of the hull; and a roof configured to slide along the rail system coupled to the hull.

In any of the preceding embodiments, the roof is configured to slide between a closed configuration in which the interior is inaccessible and an open configuration in which the interior is accessible.

In any of the preceding embodiments, the four quarter hull sections comprise: a first front quarter hull coupled to a first rear quarter hull, and a second front quarter hull coupled to a second rear quarter hull.

In any of the preceding embodiments, the first front quarter hull is a substantial duplicate of the second rear quarter hull, and the second front quarter hull is a substantial duplicate of the first rear quarter hull.

In any of the preceding embodiments, the first front quarter hull coupled to the first rear quarter hull is substantially reflectively symmetrical to the second front quarter hull coupled to the second rear quarter hull.

In any of the preceding embodiments, the roof comprises one or more energy harvesting arrays configured as a power recharging source for the watercraft.

In any of the preceding embodiments, the vessel further includes a propulsion unit coupled to the hull.

In any of the preceding embodiments, the vessel further includes a controller configured to accept inputs and respond with directional and power influences on the propulsion unit.

In any of the preceding embodiments, the propulsion unit is configured to create forces and force direction to cause the vessel to move one or more of: laterally, bi-directionally, or rotationally based on the inputs from the controller.

Another aspect of the present disclosure is directed to a watercraft comprising: a hull comprising four quarter hulls, each configured as a self-contained buoyancy chamber; a frame configured to couple the four quarter hulls together; and a first roof section and a second roof section, each configured to slide along a rail system coupled to the hull.

In any of the preceding embodiments, the first roof section and the second roof section are configured to slide between a closed configuration in which the first roof section is in contact with the second roof section and an open configuration in which the first roof section is set apart from the second roof section.

In any of the preceding embodiments, the four quarter hulls comprise: a first front quarter hull coupled to a first rear quarter hull, and a second front quarter hull coupled to a second rear quarter hull.

In any of the preceding embodiments, the first front quarter hull is a substantial duplicate of the second rear quarter hull, and the second front quarter hull is a substantial duplicate of the first rear quarter hull.

In any of the preceding embodiments, the first front quarter hull coupled to the first rear quarter hull is substantially reflectively symmetrical to the second front quarter hull coupled to the second rear quarter hull.

In any of the preceding embodiments, the roof comprises one or more energy harvesting arrays configured as a power source for the watercraft.

In any of the preceding embodiments, the vessel further includes a propulsion unit coupled to the hull.

In any of the preceding embodiments, the vessel further includes a controller configured to accept inputs and respond with directional and power influences on the propulsion unit.

In any of the preceding embodiments, the propulsion unit is configured to create forces and force direction to cause the vessel to move one or more of: laterally, bi-directionally, or rotationally based on the inputs from the controller.

In any of the preceding embodiments, the vessel further includes a second propulsion unit configured to independently respond with directional and power outputs respective to the inputs from the controller.

In any of the preceding embodiments, both the first propulsion unit and the second propulsion unit are configured to be adjusted between a stowed position and a deployed position.

BRIEF DESCRIPTION OF THE DRAWINGS

The foregoing is a summary, and thus, necessarily limited in detail. The above-mentioned aspects, as well as other aspects, features, and advantages of the present technology are described below in connection with various embodiments, with reference made to the accompanying drawings.

The illustrated embodiments are merely examples and are not intended to limit the disclosure. The schematics are drawn to illustrate features and concepts and are not necessarily drawn to scale.

DETAILED DESCRIPTION

The foregoing is a summary, and thus, necessarily limited in detail. The above-mentioned aspects, as well as other aspects, features, and advantages of the present technology will now be described in connection with various embodiments. The inclusion of the following embodiments is not intended to limit the disclosure to these embodiments, but rather to enable any person skilled in the art to make and use the contemplated invention(s). Other embodiments may be utilized, and modifications may be made without departing from the spirit or scope of the subject matter presented herein. Aspects of the disclosure, as described and illustrated herein, can be arranged, combined, modified, and designed in a variety of different formulations, all of which are explicitly contemplated and form part of this disclosure.

Any of the vessel embodiments described herein may be operable in a waterway, such as a river, ocean, lake, stream, etc. A user of the vessels described herein may include a novice user, skilled user, captain, vacationer, logistics manager, etc.

According to the following disclosure, use of the nautical terms port (left) and starboard (right) are with respect to the bow of the vessel. However, since portions of the hulls of the vessels described herein are symmetrical or reflectively symmetrical, port (left) and starboard (right) are labeled to facilitate understanding of the following figures.

Figure 1:
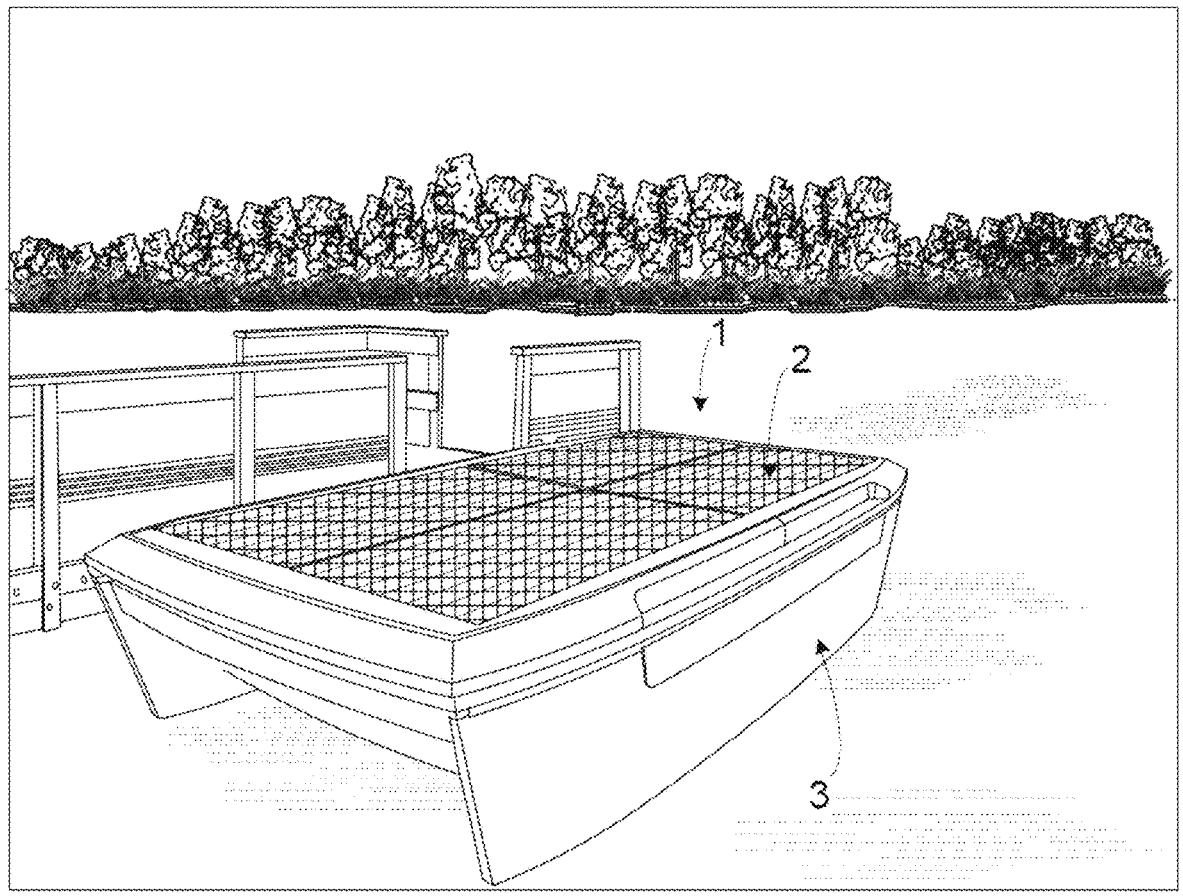
FIG. 1 is a perspective view of an embodiment of a vessel having an energy harvesting roof in a closed position.
Figure 3A:
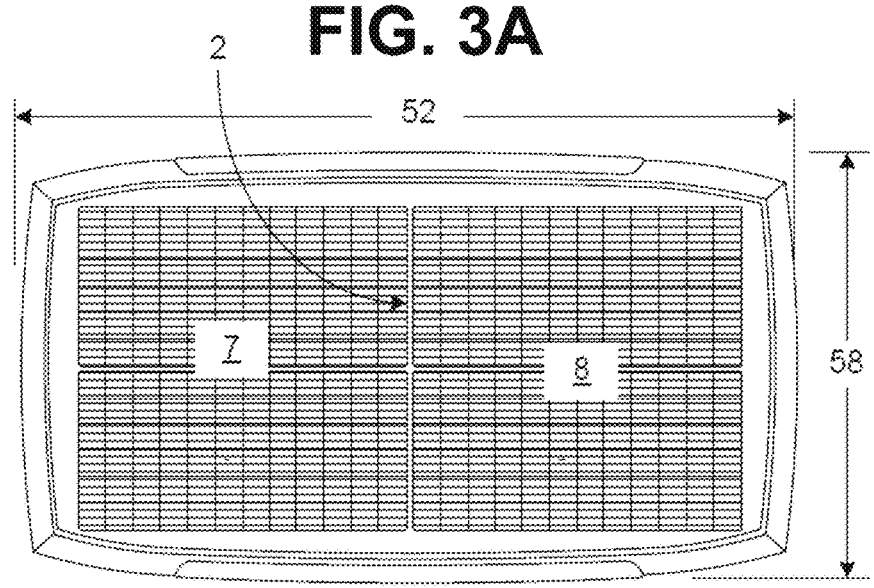
FIG. 3A is an overhead view of an embodiment of a vessel with a closed energy harvesting roof.

Referring now to FIGS. 1 and 3A, which show of one embodiment of a vessel 1 docked with the energy harvesting roof 2 in a closed position. This closed position is achieved by sliding the first roof section 7 and the second roof section 8 toward one another. In another embodiment, the closed position is achieved by sliding the first roof section 7 relative to a stationary second roof section 8. In still a further embodiment, the closed position is achieved by sliding the second roof section 8 relative to a stationary first roof section 7. In another embodiment, there is only one roof 2 section such that the roof 2 section slides to a closed position relative to a hull of the vessel. In FIG. 3A, the shortened length 52 of the vessel in the closed position is illustrated. Although the embodiment shown in FIG. 1 incorporates energy harvesting panels, one of skill in the art will appreciate that any form of energy harvesting known in the art may be used (e.g., wind, water, kinetic, etc.). This configuration allows for maximum energy harvesting, while taking up minimal dock space. In such closed configuration, a user may not access an interior of the vessel and/or the vessel may be locked such that use of the vessel is prevented. One aspect of the novelty of the various embodiments resides in features that allow for a minimal footprint during inactivity and a large user space during activity and accomplishing both while retaining a large energy harvesting cross-section.

One of skill in the art will also appreciate that although the roof 2 is shown as having an energy harvesting array thereon, the mechanisms that are used to maneuver the roof 2 between a closed configuration and an open configuration may be employed on a roof that does not have energy harvesting capabilities and/or on a roof 2 that comprises one section or a plurality of sections. In some embodiments, the energy harvesting array comprises one or more photovoltaic panels. For example, the photovoltaic panels on the roof 2 may be used as the primary charging source for the vessel's energy storage devices, which power the system's electrical devices. These energy storage devices may include, but are not limited to, batteries, capacitors or any other suitable energy storage devices known in the art. In further embodiments, the energy harvesting array may be the direct power source for the vessel's electrical devices, thereby eliminating the need for energy storage devices. Both indirect and direct configuration embodiments, as described above, may use the energy harvesting array as their primary power source. Being the primary power source does not mean sole power source, as further contemplations include, electrical grid plug-ins, generators, or any other suitable methods and/or devices known in the art.

Figure 2:
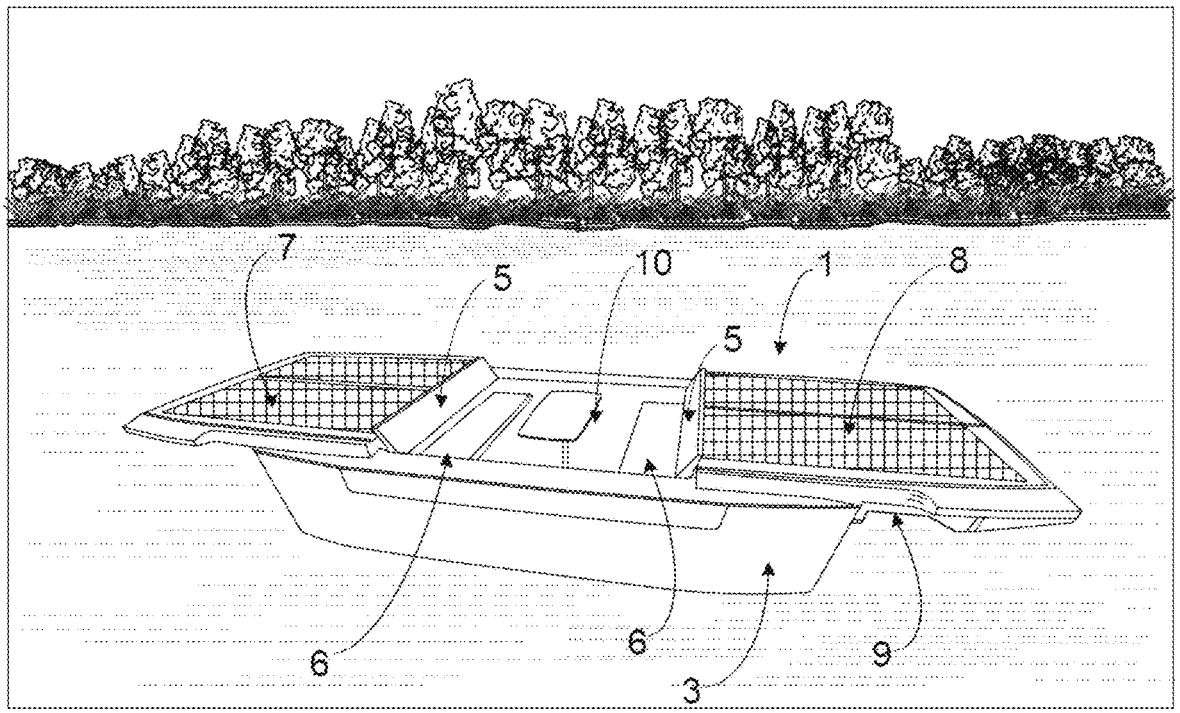
FIG. 2 is a perspective view of an embodiment of a vessel having an energy harvesting roof in an open position.
Figure 3B:
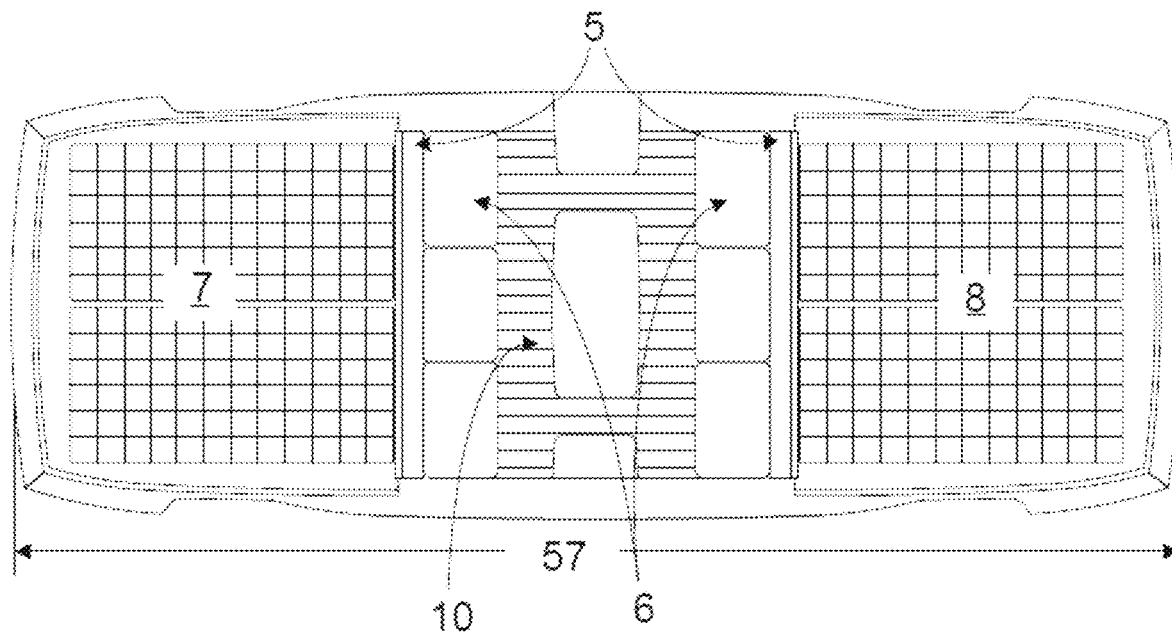
FIG. 3B is an overhead view of the vessel of FIG. 3A with an open energy harvesting roof.

FIGS. 2 and 3B show the vessel 1 of FIGS. 1 and 3A with the energy harvesting roof 2 in an open position and ready for loading one or more passengers and/or cargo therein. The open position is achieved by sliding apart the first roof section 7 and the second roof section 8, thereby exposing the interior 10 of the vessel 1. FIG. 3B shows the extended length 5 of the vessel 1 in the open configuration. The roof 2 is configured to move from the closed configuration to an open configuration via one or more manual or automatic mechanisms. For example, the roof sections 7,8 may be movable to an open configuration by unlocking the roof with a wireless signal controlled by a portable computer such as a smartphone, wearable device, laptop, or the like. The portable computer may include an application downloaded thereon and stored in memory, operation of which is required for unlocking the vessel. For example, the vessel may be unlocked using a password, code, biometric, sensed location, etc. Alternatively, in some embodiments, a vessel may be unlocked via a physical lock and key, a physical keypad located on the device, or similar physical mechanism.

As illustrated in FIGS. 3A-3B, with respect to the interior of an embodiment of vessel 1, there are two configurations shown: closed or covered (FIG. 3A) and open or exposed (FIG. 3B). As shown in FIGS. 2 and 3B, an interior 10 of a vessel may include one or more seats 5 with seat components 6, tables, furniture, coolers, refrigerators, etc. for passenger use. Additionally, FIGS. 3A-3B show one embodiment of a vessel in a closed and open configuration, respectively, with various dimensions indicated. As shown in FIG. 3A, in a closed configuration, the vessel 1 may have a shortened length 52 of about 3.048 m (10 ft.) to about 6.096 m (20 ft.). In an open configuration, as shown in FIG. 3B, the vessel may have an extended length 57 of about 4.572 m (15 ft.) to about 9.144 m (30 ft.). A width 58 of the vessel in a closed or open configuration may be about 1.524 m (5 ft.) to about 3.048 m (10 ft.). One of skill in the art will appreciate that, although certain dimensions are shown, any size or dimensions are contemplated by the present disclosure and within the skill of one in the art.

Figure 4A:
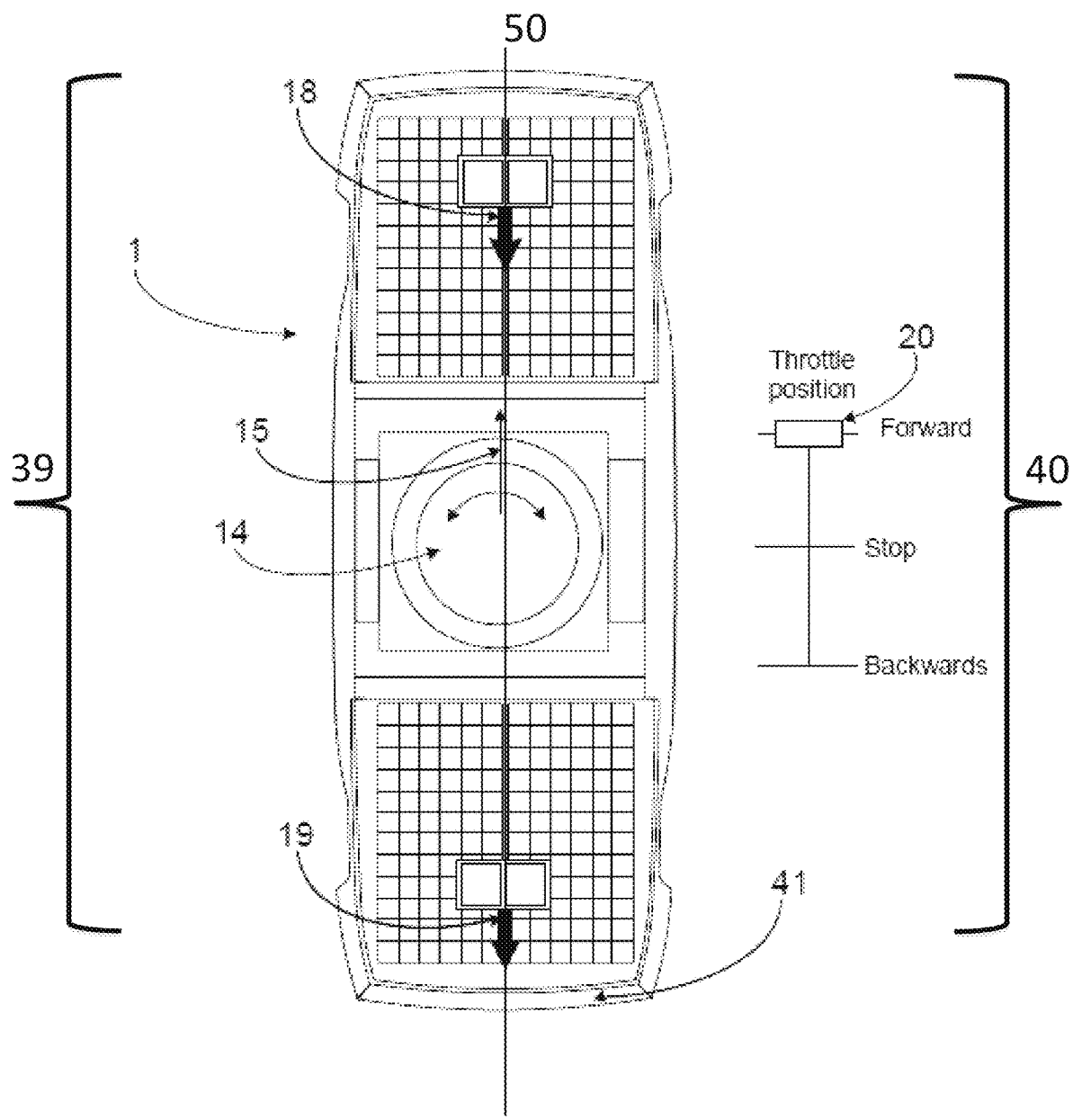
FIG. 4A is a depiction of an embodiment of a user interface, wherein control schemes, control inputs, and their corresponding performance outputs are depicted.
Figure 4B:
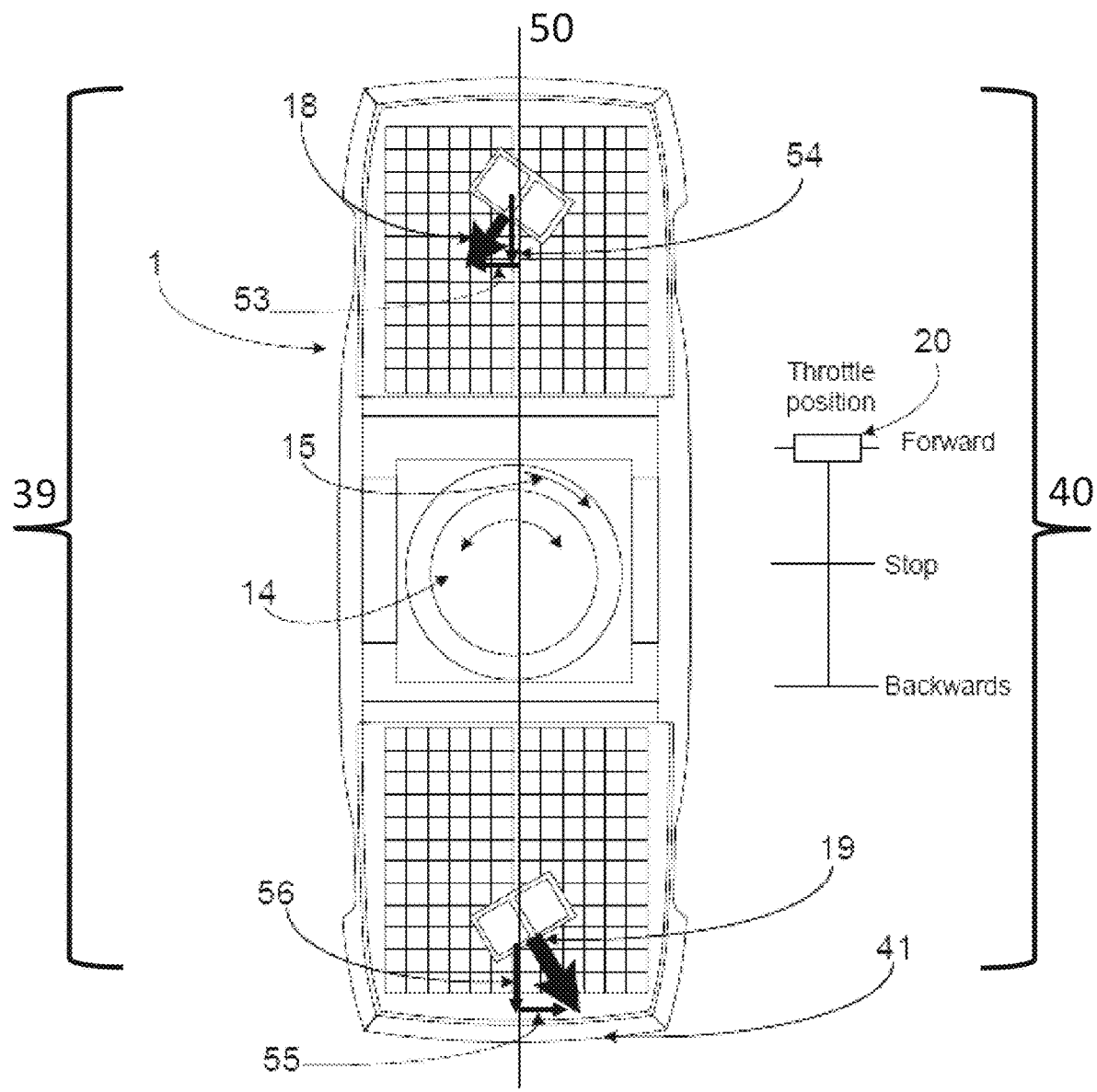
FIG. 4B is a depiction of an embodiment of a user interface, wherein control schemes, control inputs, and their corresponding performance outputs are depicted.

One of the many benefits of any of the embodiments described herein is its extreme ease-of-use, especially for novice or inexperienced boaters. FIGS. 4A-4E illustrate several variations of a user interface that allow for precise rotation, lateral movement, speed control, and/or various operational modes. Although buttons and sliders are shown, one of skill in the art will appreciate that any user interface element is contemplated, including but not limited to toggles, virtual user interface elements (implemented on a touchscreen), joysticks, trackpads, trackballs, etc. The embodiments of the user interface illustrated in FIGS. 4A-4E are five demonstrative figures of user interface inputs and the corresponding response of the front propulsion unit 11, represented by the front thrust arrow 18, and the rear propulsion unit 12, represented by the rear thrust arrow 19. In the following description, it is necessary to describe some thrust vectors by splitting the vector into two components, therefore the horizontal component of the thrust vector is described here as the component perpendicular to the centerline 50 of the vessel 1, and the vertical component is described here as the component parallel to the centerline 50 of the vessel 1. As illustrated in FIG. 4A, a straight-forward heading is indicated with the direction input 14 (shown as a dial) and direction of the vessel 1 is represented by the direction indicator 15. The speed input 20 is set to forward. The result of the combined control inputs creates outputs from the propulsion units 11,12, as represented by the front thrust arrow 18 and the rear thrust arrow 19. As illustrated, the thrust vector generated by first and second propulsion units 11,12 is collinear with the centerline 50 of the vessel 1, and creates an opposite propulsion force, which pushes the vessel 1 forward. In FIG. 4B, a right turn is indicated with the direction input 14, with forward progress as indicated with the speed input 20. With this combination of inputs, the front propulsion unit 11 creates a thrust vector with a horizontal component 53 toward the port 39 side of the vessel 1, and the other vertical component 54 toward the rear 41 of the vessel 1. The rear propulsion unit 12 creates a thrust vector with a horizontal component 55 toward the starboard side 40 of the vessel 1 and the other vertical component 56 toward the rear 41 of the vessel 1. The two horizontal components both add to a moment in the clockwise direction about the vessel 1 center of gravity (CG), rotating the vessel 1 in a clockwise direction, while propelling the vessel 1 forward. The ratio of the moment generated versus the forward propulsion is dependent on the position of the direction indicator 15 and the speed input 20.

Figure 4C:
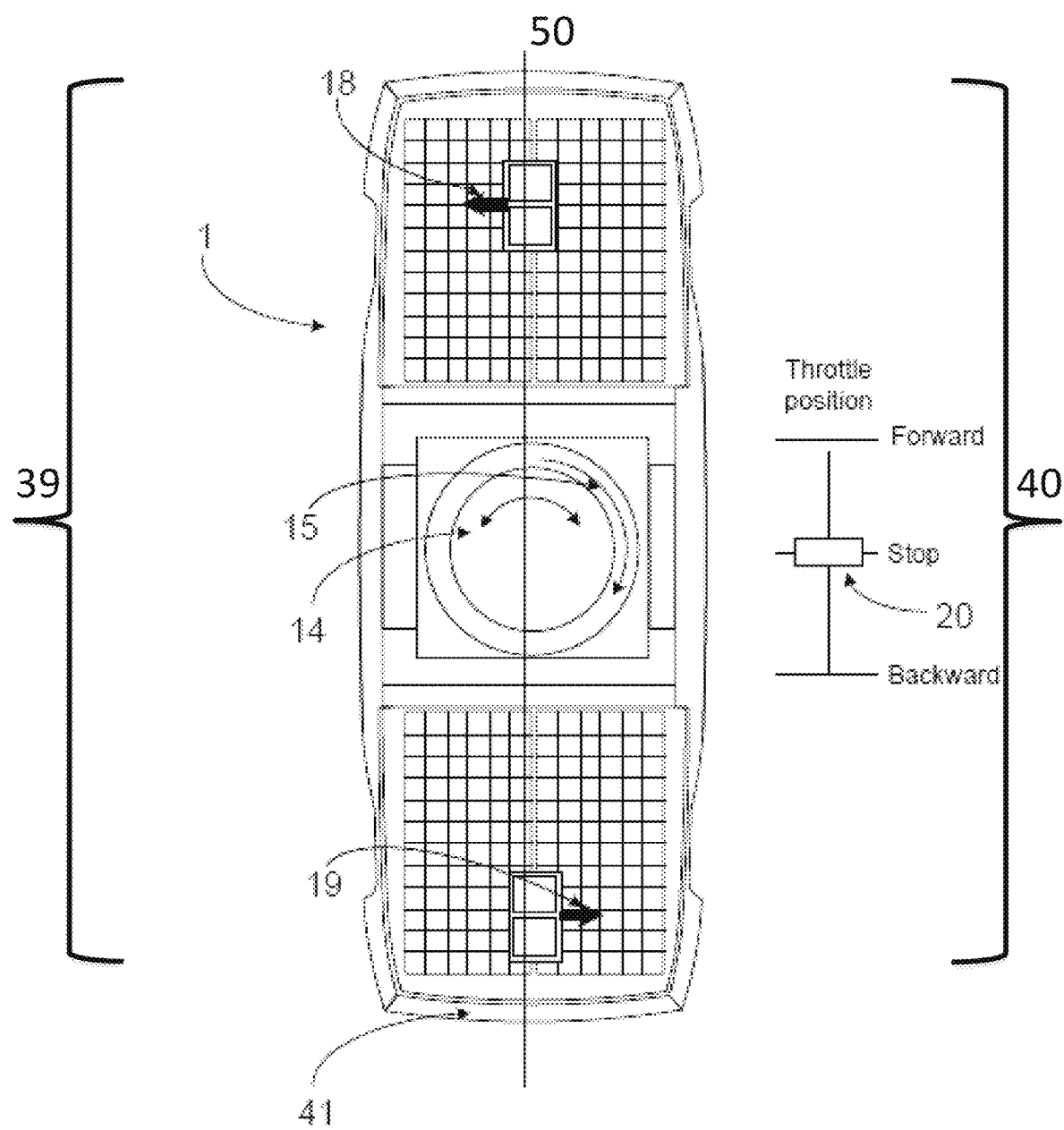
FIG. 4C is a depiction of an embodiment of a user interface, wherein control schemes, control inputs, and their corresponding performance outputs are depicted.
Figure 4D:
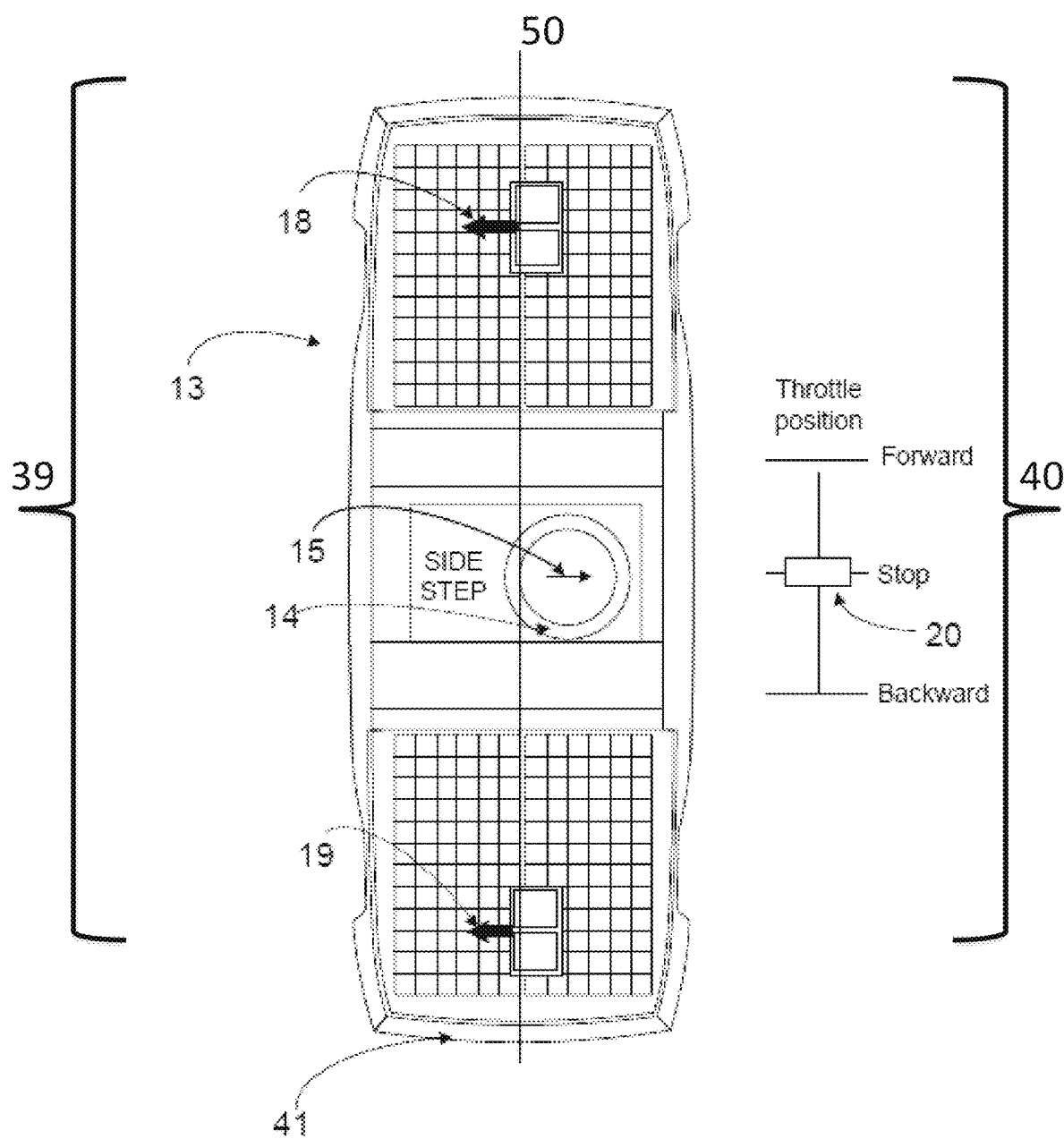
FIG. 4D is a depiction of an embodiment of a user interface, wherein control schemes, control inputs, and their corresponding performance outputs are depicted.

Further illustrating, FIG. 4C shows user inputs combined to create a right hand turn without forward progression by adjusting the direction input 14 to the right and setting the speed input 20 to zero. As shown by the front thrust arrow 18 and the rear thrust arrow 19, thrust from the front propulsion unit 11 is being directed toward the port 39 side of the vessel 1 and perpendicular to the centerline 50 of the vessel 1, and thrust from the rear propulsion unit 12 is being directed to the starboard 40 side of the vessel 1 and perpendicular to the centerline 50 of the vessel 1. Both thrusts create force adding only to a clockwise moment about the CG of the vessel and zero force adding to the propulsion of the vessel 1. The result is a clockwise rotation about the CG of the vessel 1. FIG. 4D illustrates a combination of user inputs that propel the vessel in a starboard 40 direction while maintaining the vessel 1 heading. By adjusting the direction input 14 toward the starboard 40 side, and not twisting it, as in previous examples, both the front propulsion unit 11 and the rear propulsion unit 12 create thrust toward the port 39 side of the vessel 1 and perpendicular to the centerline 50 of the vessel 1. The resulting forces create equal and opposite moments about the CG of the vessel 1. Thus, propelling the vessel to the starboard direction, while not rotating the vessel 1.

Figure 4E:
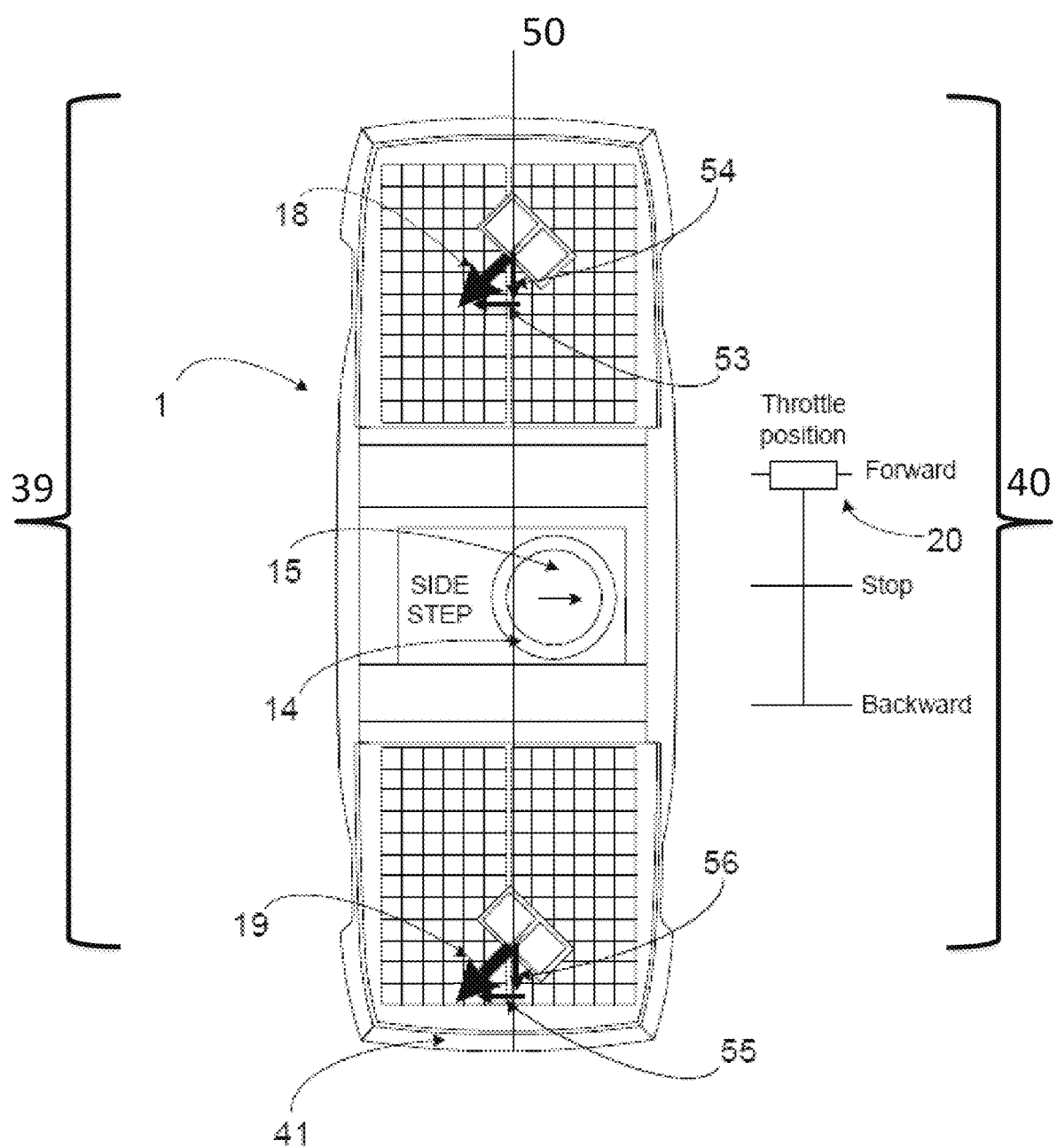
FIG. 4E is a depiction of an embodiment of a user interface, wherein control schemes, control inputs, and their corresponding performance outputs are depicted.

FIG. 4E provides illustration of the user input combination which results in a change of course but not a change of heading. Once again, the direction input 14 is pressed toward the starboard 40 side and not rotated, and the speed input 20 is set to a forward speed. The resulting output combination is thrust from both the forward propulsion unit 11 and the rear propulsion unit 12 having a horizontal component 53, 55 to the port 39 side and a vertical component 54, 56 to the rear 41. Like FIG. 4D, the resulting moments from the two horizontal components 53, 55 of these thrust outputs are equal and opposite, and thus, the vessel is not rotated. Unlike FIGS. 4C-4D, the vertical components 54, 56 created by the front propulsion unit 11 and the rear propulsion unit 12 propel the vessel 1 forward. Although several examples are explicitly demonstrated, one of ordinary skill in the art can recognize the control inputs can be combined, removed, and/or reversed for any desired performance outputs.

Figure 5A:
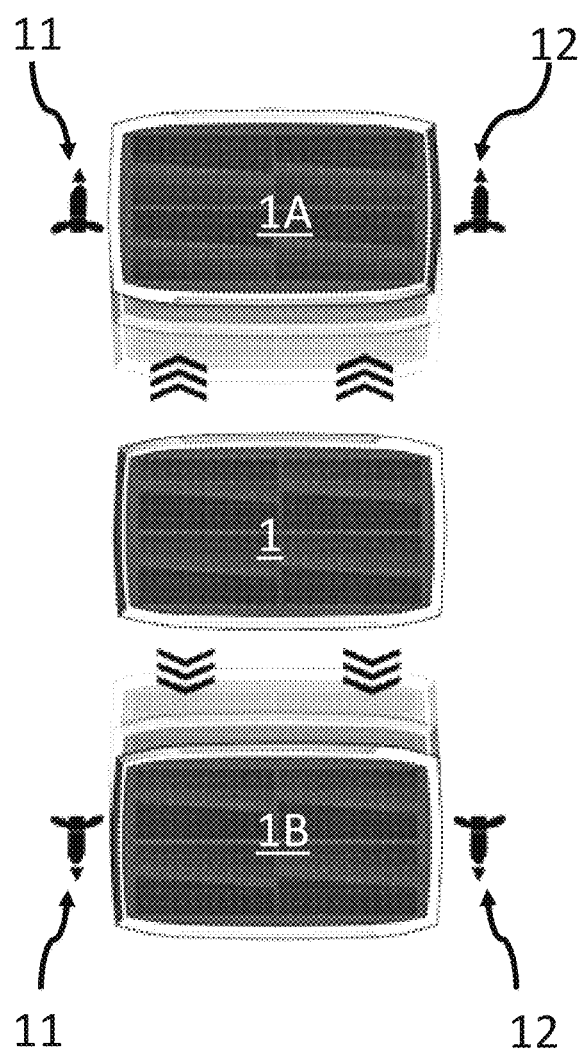
FIG. 5A is an aerial view of a vessel configured to perform lateral movements.
Figure 5B:
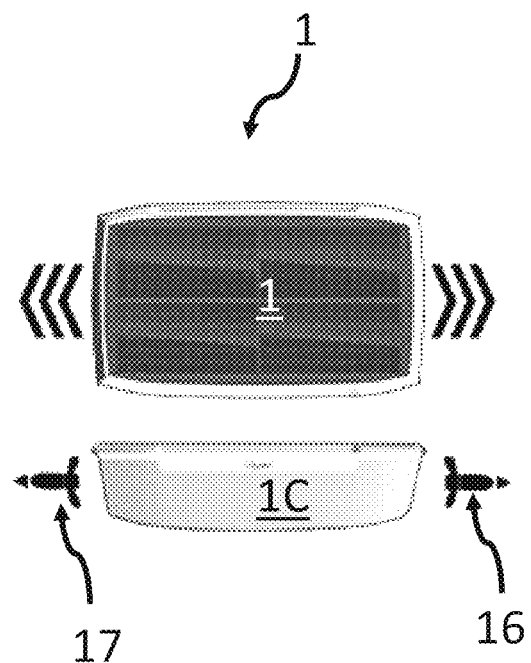
FIG. 5B is an aerial view of a vessel configured to perform bi-directional movements.
Figure 5C:
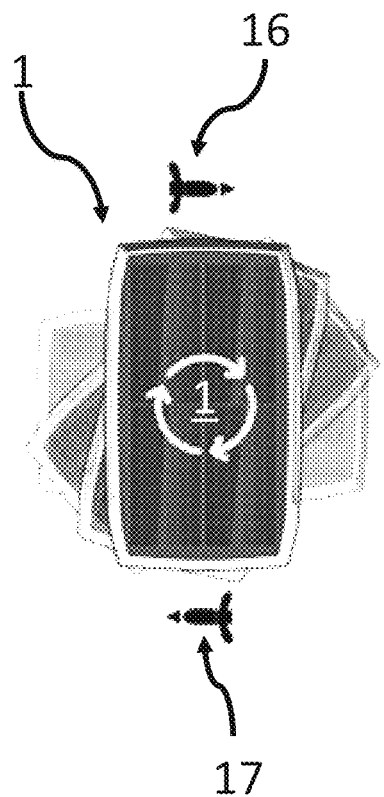
FIG. 5C is an aerial view of a vessel configured to perform a center point turn.

FIGS. 5A-5C illustrate various vessel movements (e.g., forward, reverse, turn, pivot, sidestep left or right, drift, etc.) elicited by the front propulsion unit 11 and/or rear propulsion unit 12 based on user input (e.g., based on the direction and throttle position). The unique hull design, as described elsewhere herein, further facilitates the wide variety of movements of the vessels described herein. The movements illustrated in FIGS. 5A-5C are intended for example and are in no way limiting. FIG. 5A illustrates the lateral maneuverability of vessel 1. The center vessel 1 is used to represent the static vessel 1 prior to front and rear propulsion unit 11, 12 force influence. The upper vessel 1A shows a dynamic vessel 1 with influence of propulsion forces. With thrust from both the front propulsion unit 11 and the rear propulsion unit 12 being directed toward the center vessel 1 and the resulting forces being opposite thereof. The upper vessel 1A is shown as moving away from the center vessel 1. This described movement is the vessel 1 reaction to that of user inputs of FIG. 4D. Further, the movement, influencing forces, and the user inputs of the lower vessel 1B are equal and opposite to that of the upper vessel 1. FIG. 5B illustrates the bi-directional movements of the vessel 1. Although depicted as opposing one another, the front propulsion unit 11 and rear propulsion unit 12 may work in unison to achieve movement to the left or port side 17 and/or to the right or starboard side 16 shown by the arrows next to the vessel 1C. FIG. 5B illustrates the bi-directional capability of the vessels described herein, which is provided by the symmetrical hull design, as will be further described elsewhere herein. FIG. 5C illustrates the rotational capability of the present invention. This maneuver may be the result of the user inputs described in connection with FIG. 4C. The symmetrical hull design further simplifies the control system. Due to these symmetric features, the hydrodynamic profiles are similar for equal and opposite turns, pivots, sidesteps, and/or bi-lateral movements. These similar hydrodynamic profiles allow similar output requirements for equal and opposite performance outputs. For example, the control outputs to make a same degree heading change to the left as the right, while retaining the same forward progress, are substantially equal and opposite. Control is thereby simplified due to the substantially equal output requirements of each maneuver's counter maneuver.

Figure 6:
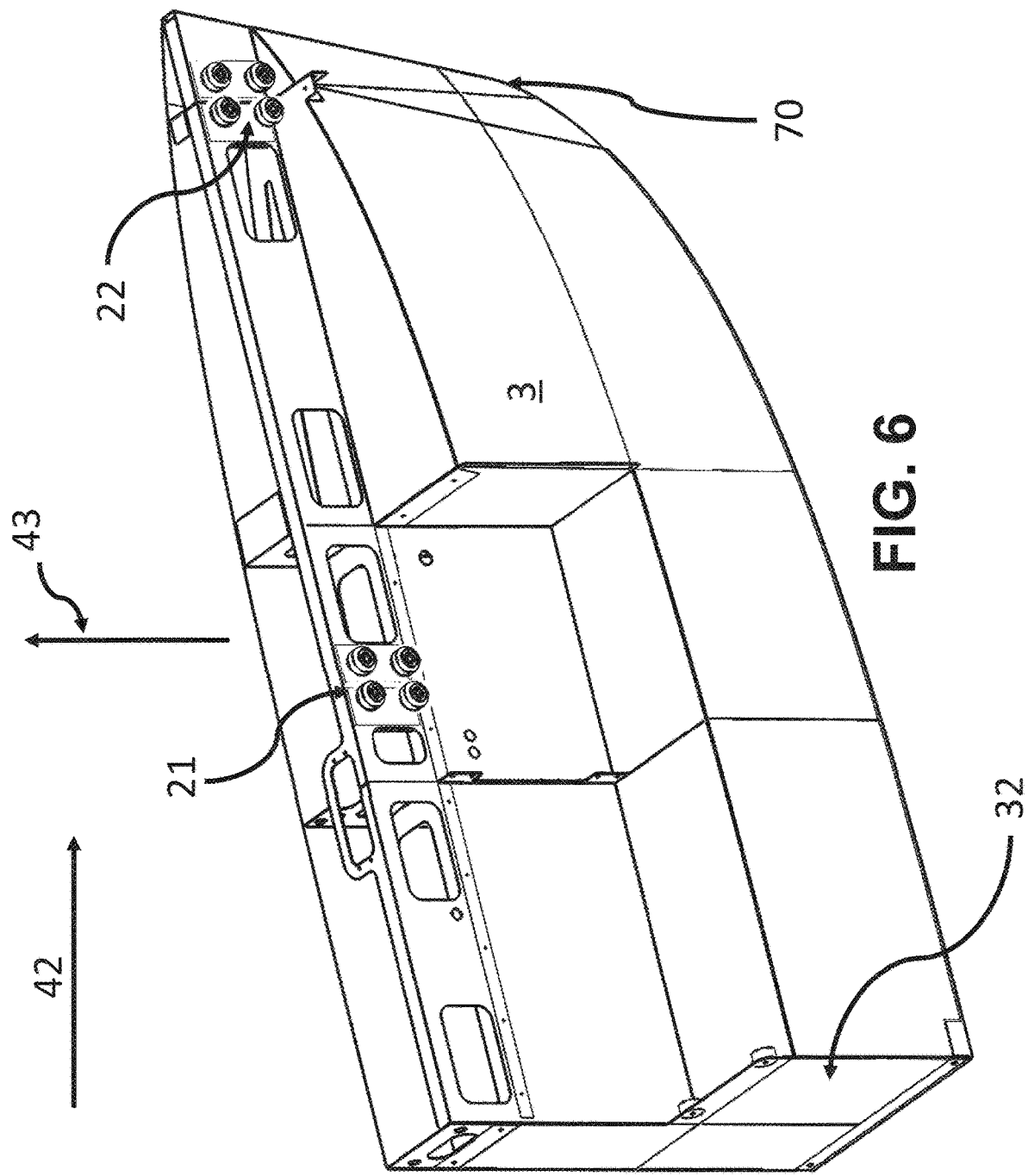
FIG. 6 is a perspective view of an embodiment of a modular portion of a vessel.
Figure 13:
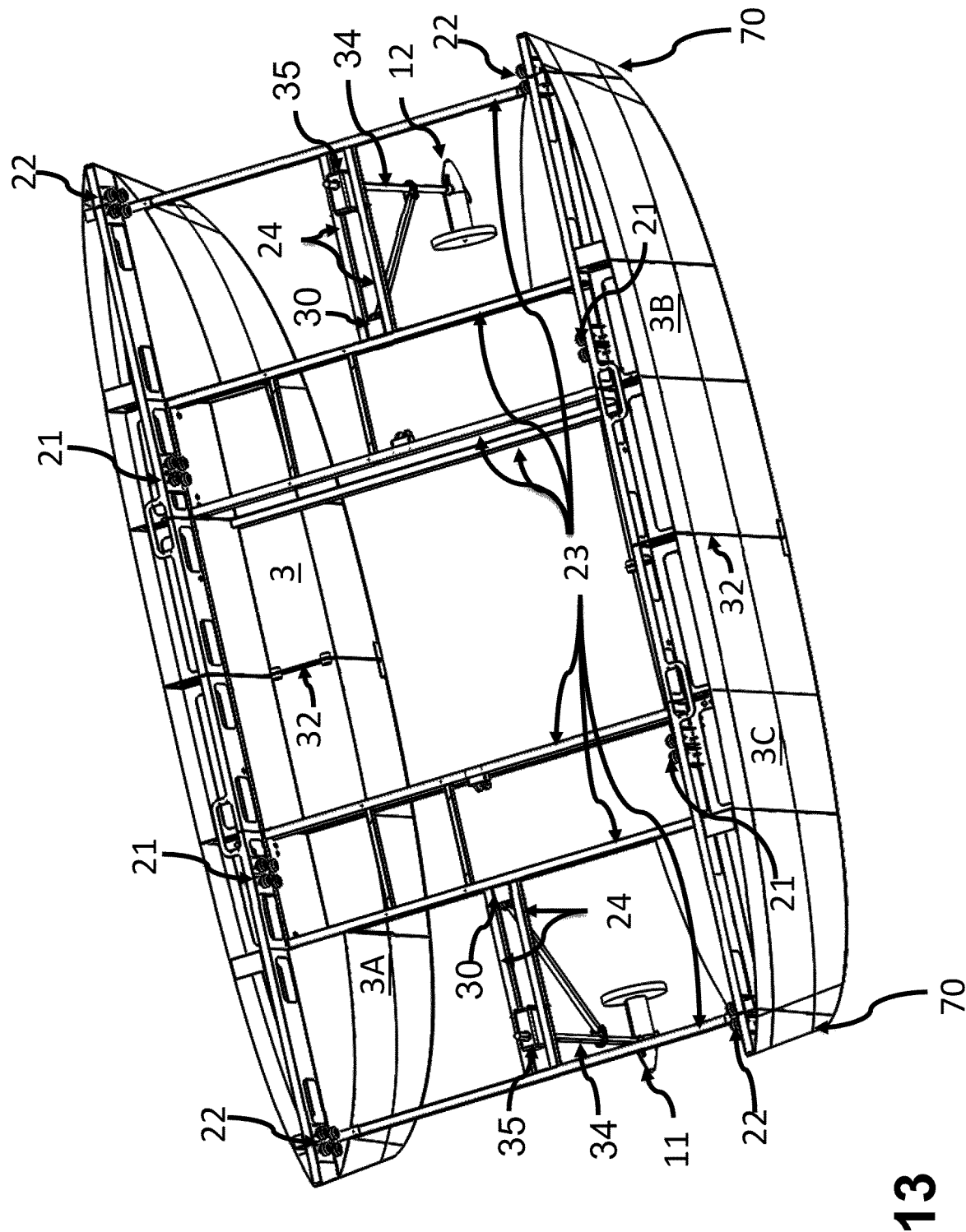
FIG. 13 is a perspective view of an embodiment of an assembled hull of a vessel with first and second propulsion units in deployed positions.
Figure 14:
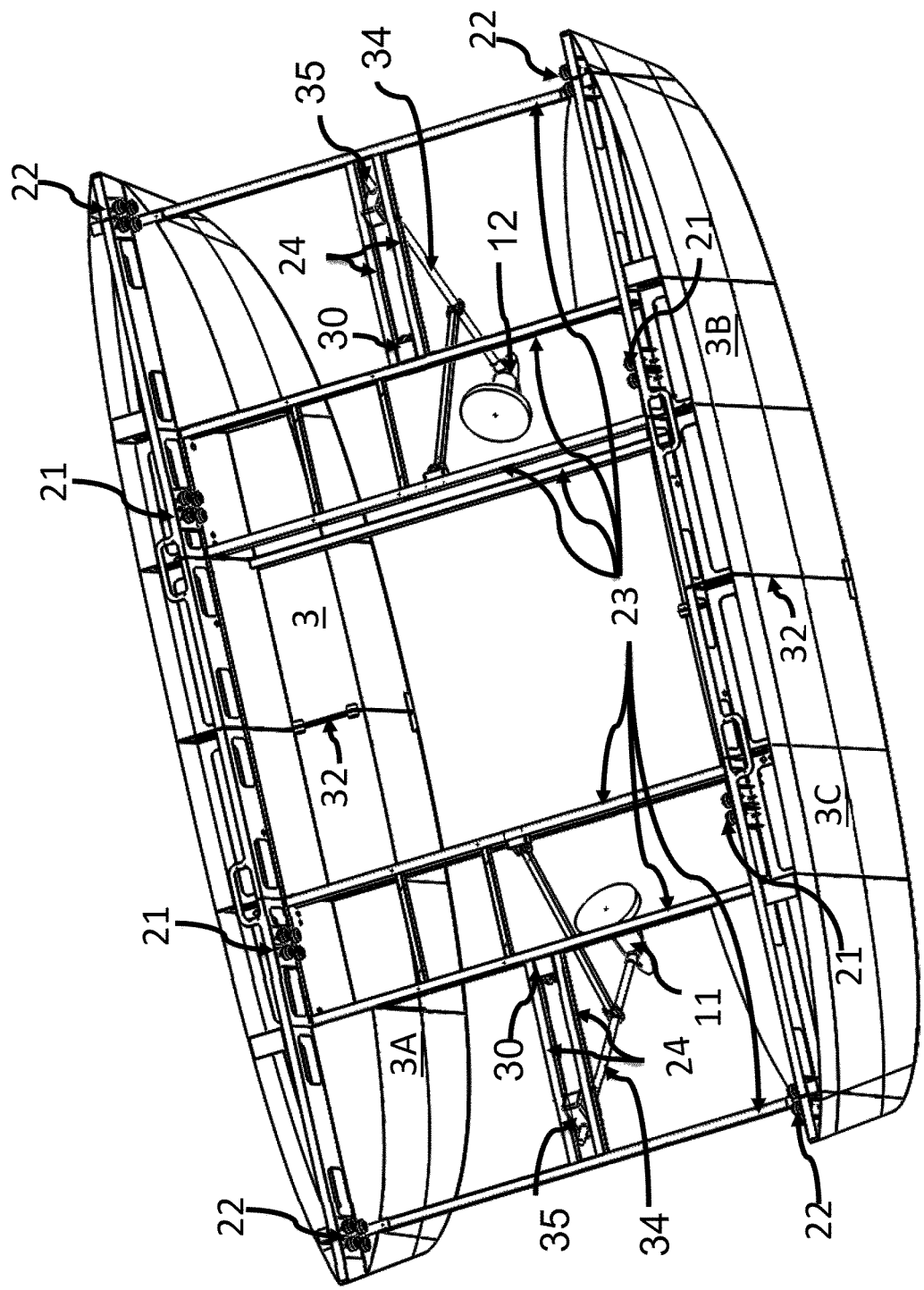
FIG. 14 is a perspective view of an embodiment of an assembled hull of a vessel with first and second propulsion units in stowed positions.

The technical problem sought to be solved by the various embodiments described herein was how to significantly improve the construction, overall safety, and efficiency of a hull of a vessel. Various technical solutions to the above technical problem are to utilize a modular and/or reflectively symmetrical quarter hull design. FIGS. 6 and 13-14 provide an illustration of one embodiment of the quarter hull modules of a vessel. These quarter hull modules 3, 3A, 3C and 3D (shown in FIGS. 13-14) allow for four completely sealed buoyancy chambers that provide redundant floatation in the event of a localized hull failure. In some embodiments, each quarter hull has an internal volume large enough to displace enough water that the resulting buoyancy force is equal to or greater than the weight of the vessel 1. Having a greater possible buoyancy force than vessel 1 weight allows for a large factor of safety. For example, if three of the four quarter hulls experiences localized failure, the remaining quarter hull can retain floatation of the vessel 1, and in doing so, prevent loss of the vessel 1. In a further example, a quarter hull on both sides can experience localized failure and the vessel 1 can remain operable. The first quarter hull 3 is reflectively duplicated to construct the first mirrored quarter hull 3A and the second mirrored quarter hull 3C. In addition, the first quarter hull 3 is a duplicate to the second quarter hull 3B. The further technical solutions, provided by the modular configuration of the quarter hulls, includes increasing the speed of construction by allowing the same hull shape to be used repeatedly during construction, reducing the number of unique parts that must be managed. The modular quarter hull design accomplishes fabrication from smaller and more standardized alloy sheets, thus increasing the cost effectiveness. The modular quarter hull design also allows for a smaller manufacturing footprint and by doing so improves fabrication competitiveness by including fabricators with less floorspace. In further embodiments, the modular quarter hull design includes design efficiencies, such as deliberate elimination of weld patterns to bolster automated welding efficiency. These design efficiencies include a unique flat leading edge of the tip 70 allowing the bottom sheet metal component to wrap around the near vertical edge and thus, eliminating a triangle-shaped weld intersection. Another novel feature of contemplated embodiments is the performance of the quarter hull when used as both the leading edge and the trailing edge. When viewed with respect to the waterline plane, the quarter hull cross-section, is seen to become narrower, convexly, from the joining face 32 to the tip 70 (shown in FIGS. 6 and 13). When used as the leading edge, this profile aids in beaching the vessel 1. When used as a trailing edge, this profile aids in reducing drag and thus, increasing travel efficiency. Further, the quarter hull design also aids in the reduction of stocked parts for the repair and maintenance of the vessel. This unique design also allows the hull to be easily lengthened, by including a modular intermediate extension section. In addition, this symmetrical hull design allows for identical performance and efficiency characteristics in both the forward and reverse directions, allowing the vessel to change directions without rotating the vessel while also improving ease-of-use. In some embodiments, a symmetrical hull comprises first and second components or first and second hull assemblies, opposite one another, mirrored to one another, and affixed to one another via a frame.

In an embodiment, as shown in FIG. 13, a symmetrical hull comprises a first quarter hull 3 and a first mirrored quarter hull 3A (mirrored about the joining face 32) coupled together and opposite a second mirrored quarter hull 3B and second quarter hull 3C coupled together. The two hull assemblies of two quarter hulls, hull 3 and hull 3A and hull 3C and hull 3B, are affixed to one another by frame components 23 therebetween, holding each hull assembly parallel to one another. This configuration is illustrated in FIGS. 13-14. Additionally, shown in FIG. 6 is the first roller assembly 21 and the second roller assembly 22. FIG. 6 illustrates how the roller assemblies 21, 22 properly constrain the lower slide rails 27 in the vertical direction 43 but allow for low friction adjustment in the horizontal direction 42.

Figure 7:
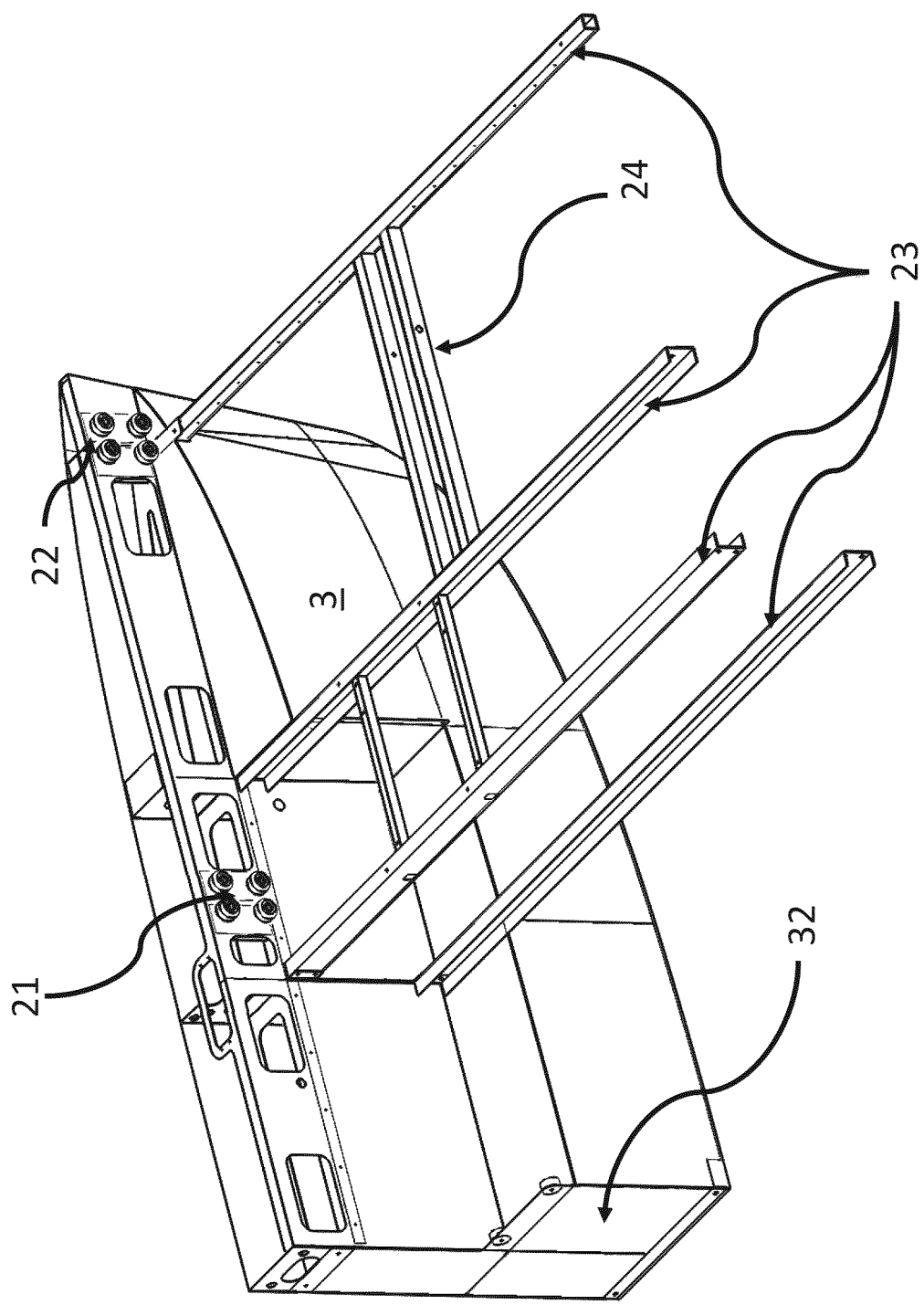
FIG. 7 is a perspective view of an embodiment of a modular portion of a vessel with connecting structural extrusions.

FIGS. 7 and 13-14 illustrate the frame components 23 that are used in mating a quarter hull 3 to a second mirrored quarter hull 3B counterpart. The hull is provided by joining the first quarter hull 3 to the first mirrored quarter hull 3A about the joining face 32, creating a first hull assembly. This first hull assembly of two quarter hulls 3, 3A is mirrored on the other end of the frame components 23, forming a second hull assembly of two quarter hulls 3B, 3C. These two hull assemblies are connected via frame components 23 and the resulting fully assembled hull is shown in FIGS. 13 and 14. The first and second hull assemblies are both coupled to the frame components 23 by any means and/or devices known in the art. The quarter hulls 3, 3A of the first hull assembly and the quarter hulls 3B, 3C of the second hull assembly are joined together about the joining face 32 by any means and/or device known in the art. In some embodiments, it is contemplated that the quarter hulls (3 to 3A and 3B to 3C) are bolted together about the joining face 32 in such a way that bolting methods beneath the waterline do not include piercing the skin of the quarter hulls 3, 3A, 3B, 3C. This quarter hull design incorporates fastening features integrated in the lowest portion of the joining face 32. Such fastening features, being integrally formed, eliminate bolting methods which require piercing the quarter hull skin. This bolting method increases the effectiveness of the quarter hull design by increasing ease of construction, increasing ease of maintenance, and adding to the longevity of the quarter hull.

Figure 8:
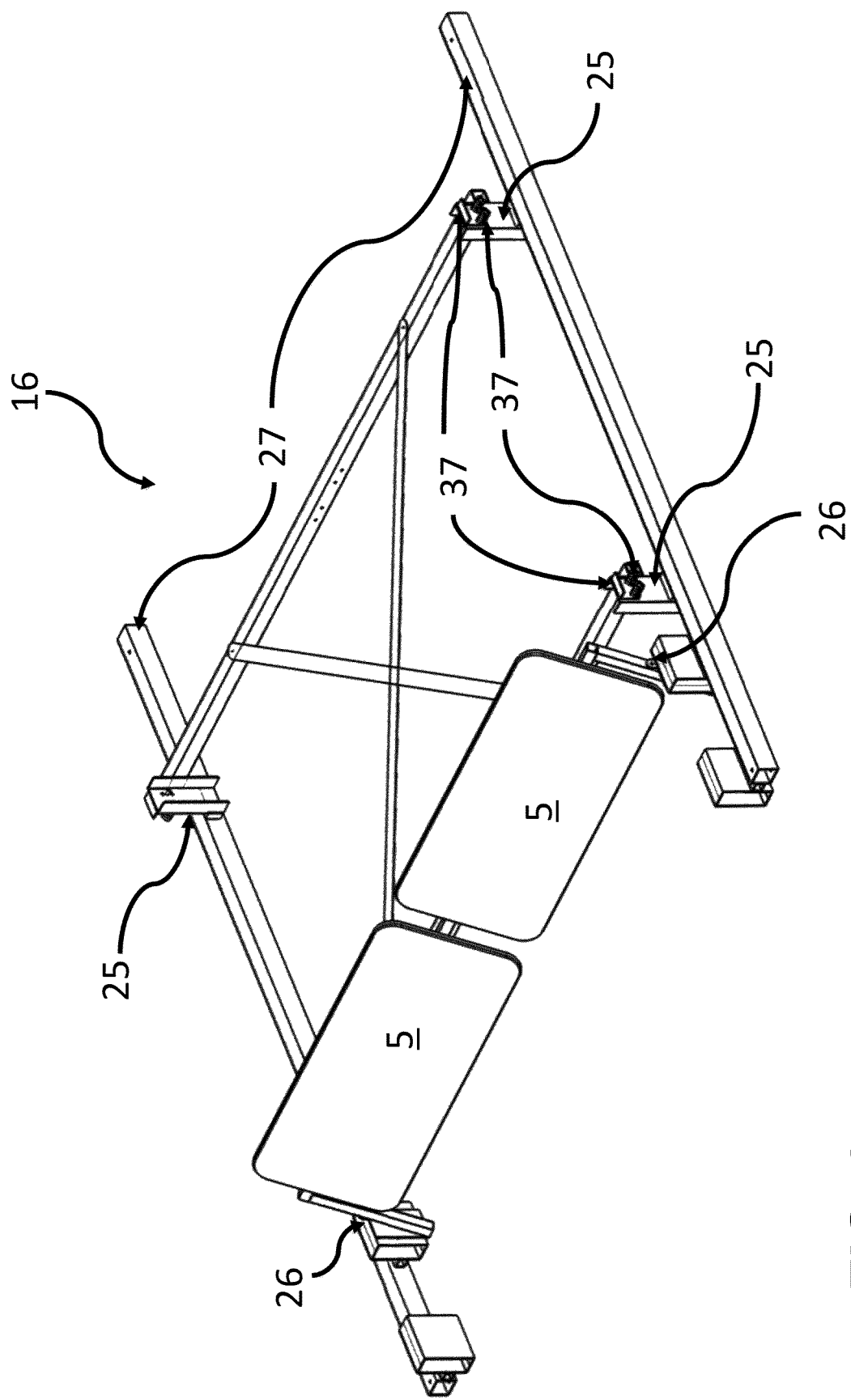
FIG. 8 is a perspective view of an embodiment of a lower slide assembly of a vessel, with integrated seat component shown in a deployed position.
Figure 9:
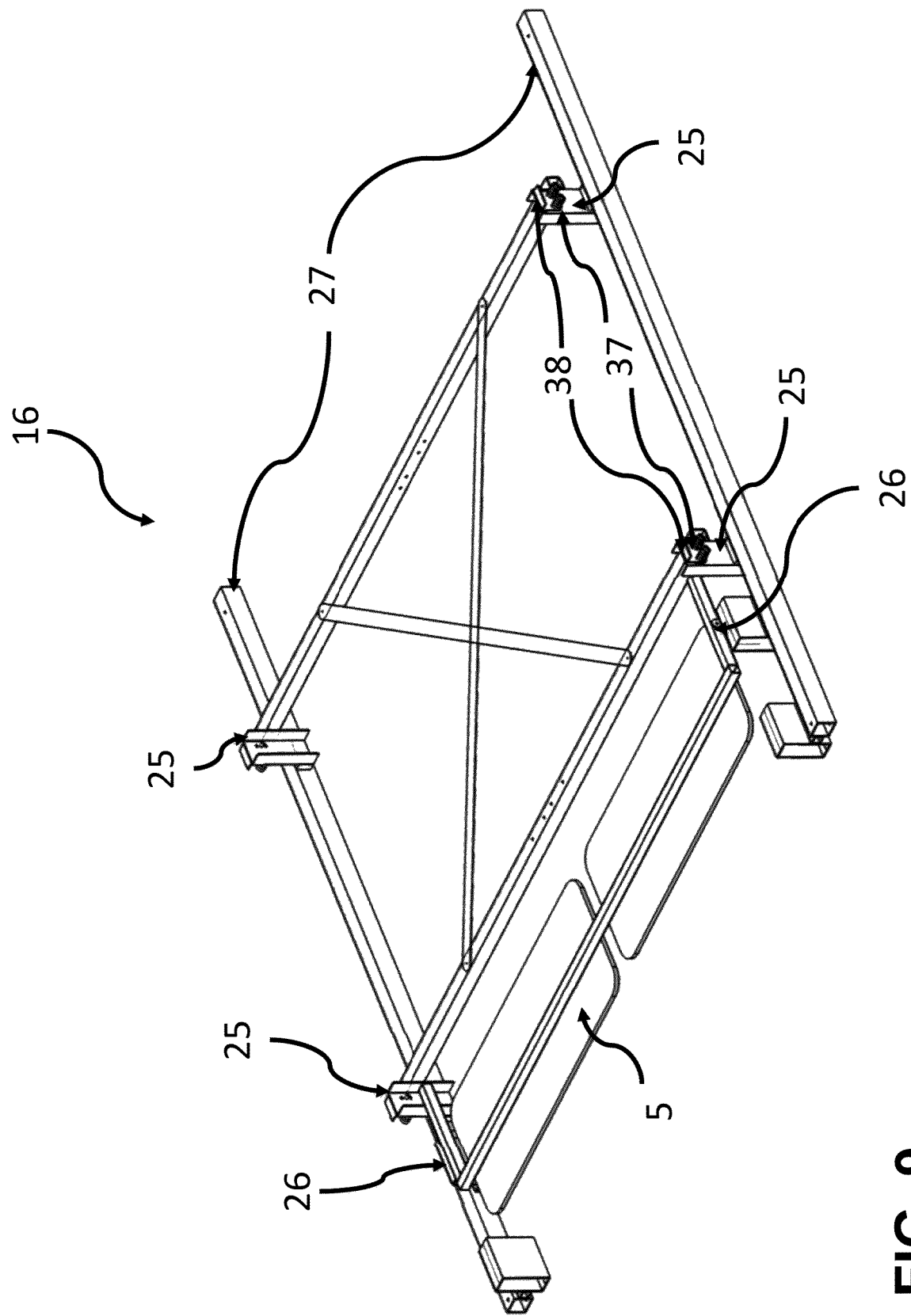
FIG. 9 is a perspective view of an embodiment of a slide assembly of a vessel, with integrated seat component showed in a stowed position.

FIGS. 8-9 illustrate an embodiment of the lower slide 16 element of a vessel. The lower slide 16 comprises lower slide rails 27 configured to run within the first and second roller assemblies 21, 22 of both the quarter hull 3 and the mirrored quarter hull 3A (as can be seen in FIGS. 15-17, and 19-20). Further, the illustration shows three of the four pylons 25, and their upper rollers 37 and roof slide retainers 38. Additionally, the vessel may optionally include one or more seats in the interior 10 defined by the hull. For example, the seat component 5 can be seen connected to the lower slide 16 via seat component pivot 26, which may be repeated for any number of seats. Furthermore, as shown in FIG. 8, the seat component 5 is depicted in an unfolded, in-use position; and in FIG. 9, the seat component 5 is configured to rotate relative to the seat component pivot 26 into a folded, stow position as shown.

Figure 10:
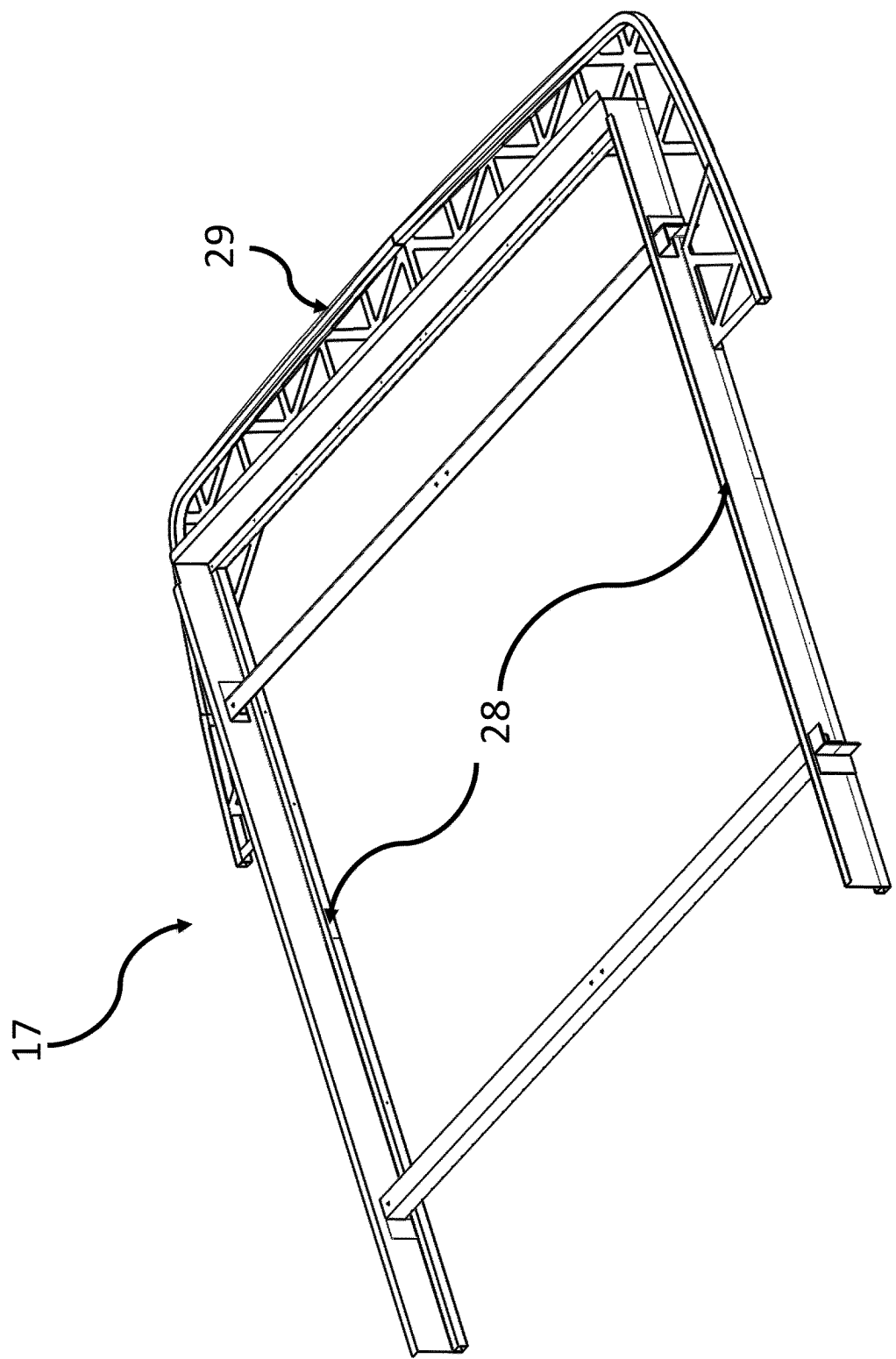
FIG. 10 is a perspective view of an embodiment of at least a portion of a slide assembly for an energy harvesting roof of a vessel.

FIG. 10 illustrates an embodiment of an upper slide 17, which may be used to support and transport a roof 2 or a roof section 7, 8. The upper slide 17 includes upper slide rails 28 which track between the upper rollers 37 and roof slide retainers 38 of the pylons 25, shown in FIGS. 8 and 9. The upper slide 17 further comprises a reinforcement truss 29 on the end where a collision is most likely to occur. The reinforcement truss 29 provides additional structural strength in the event of an unintended collision. This reinforcement becomes especially useful when one considers the high cost and fragility of the energy harvesting panels of roof 2 of some embodiments.

Figure 11:
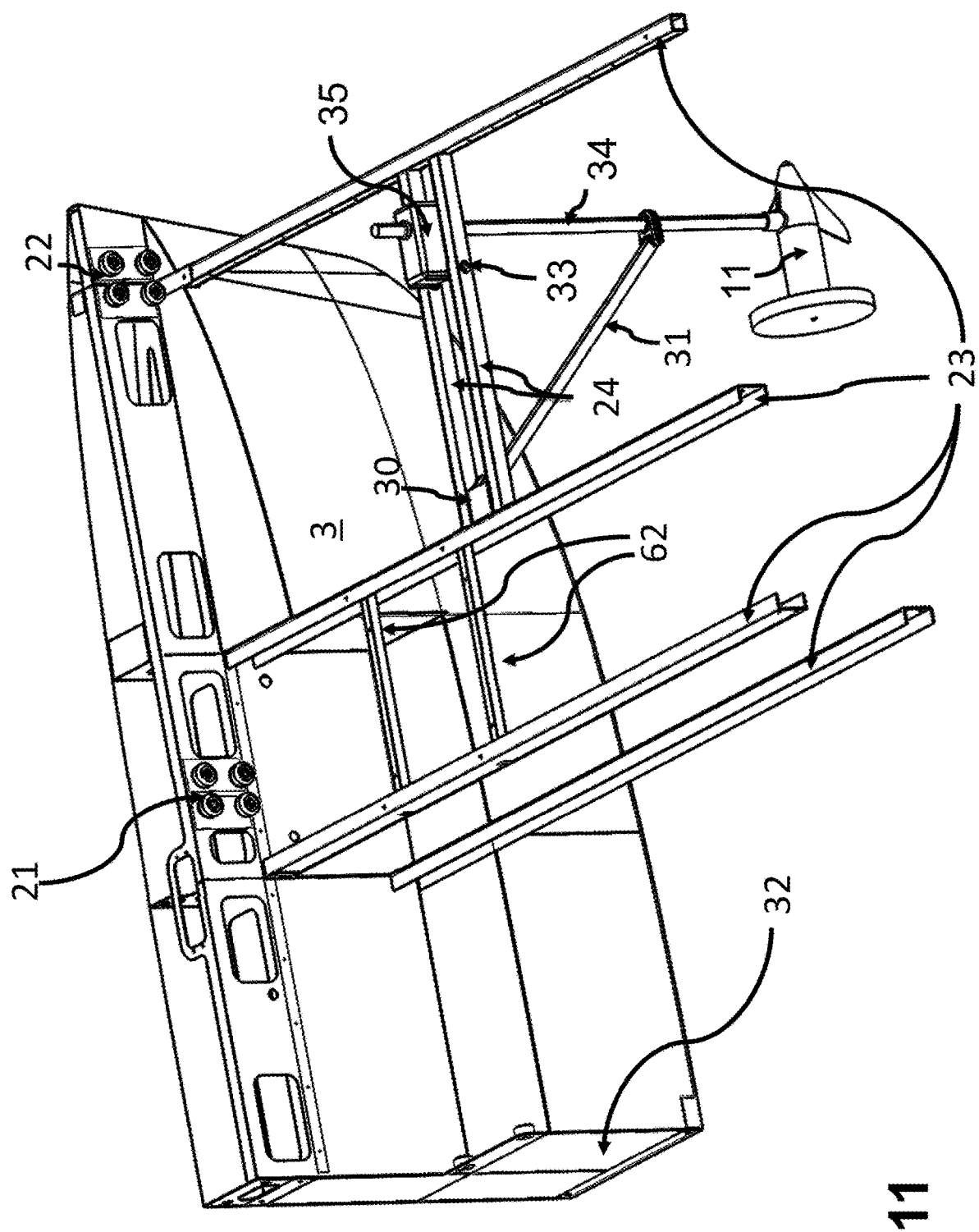
FIG. 11 is a perspective view of an embodiment of a modular portion of a vessel with a propulsion unit in a deployed position.

FIG. 11 shows a front propulsion unit 11 of an embodiment of the present disclosure, in a deployed position. The illustrated embodiment of FIG. 11 has one or more structural members 24, 62 configured to connect adjacent frame components 23. In an embodiment, one or more of the structural members 24 are configured as propulsion unit supports 24. As shown in FIG. 11, the propulsion unit pivot 33 operatively couples the front propulsion unit 11 to the propulsion unit support 24. Additionally, the propulsion unit support 24 provides operative coupling to the strut attachment point 30 in the deployed position. The propulsion unit 11 utilizes a steering assembly 35 that is configured to rotate the propulsion unit shaft 34 to achieve the directional thrust of the front propulsion unit 11. The steering assembly 35 may comprise an electric motor coupled to a gear train with a position sensor or any other suitable means and devices known in the art. This assembly and action create leveraged forces, which are sustained by the propulsion unit strut 31 (ultimately transferred to the frame via the strut attachment point 30) and propulsion unit support 24.

Figure 12:
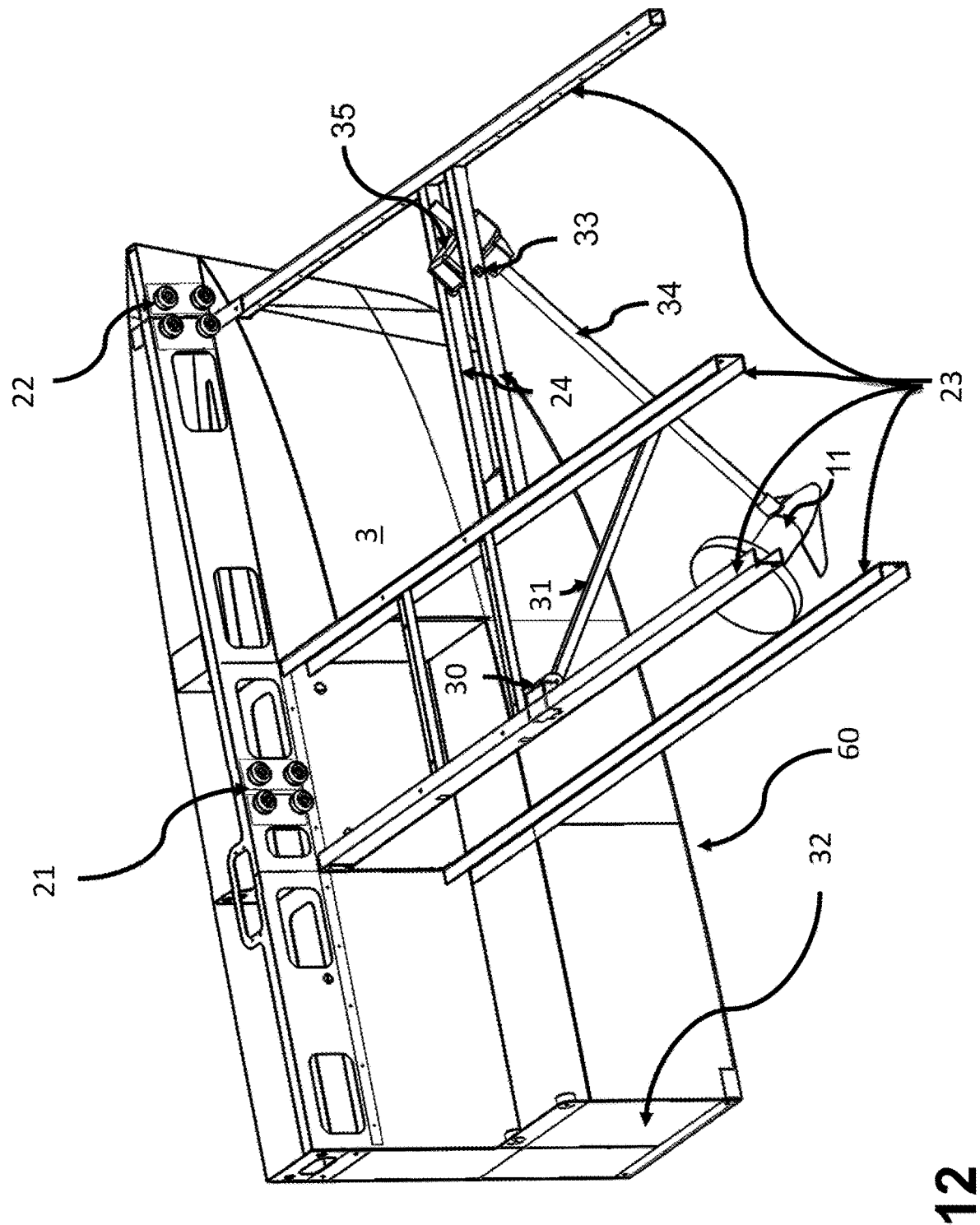
FIG. 12 is a perspective view of an embodiment of a modular portion of a vessel with a propulsion unit in a stowed position.

FIG. 12 is similar to FIG. 11, but the front propulsion unit 11 is shown in a stowed position. Adjusting the propulsion unit between a deployed and stowed position is accomplished by moving the strut attachment point 30 perpendicularly to the frame components 23 and towards the joining face 32. In turn, the propulsion unit shaft 34 is configured to rotate on the propulsion unit pivot 33, pulling the front propulsion unit 11 up above the bottom surface 60 of the quarter hull 3. The stowed position protects the propulsion unit 11 from underwater objects, beaching, trailering, etc. Although a stowed and deployed position is shown, one of skill in the art will appreciate that a plurality of intermediate positions is also conceived of and within the scope of this disclosure. Furthermore, a multitude of means and devices could be used to move the strut attachment point 30, including but not limited to the use of a cable or rope under tension, or a manual or powered winch controlled by any of the vessels described herein. In embodiments comprising a rear propulsion unit 12, it is contemplated that the rear propulsion unit 12 is substantially similar to the front propulsion unit 11. The description above involving the front propulsion unit 12 may also be used to describe the rear propulsion unit 12 and its structural and control elements. FIG. 13 further illustrates a full hull assembly including the deployed position of a front propulsion unit 11 and a rear propulsion unit 12. FIG. 14 further illustrates the stowed position of front propulsion unit 11 and rear propulsion unit 12.

Figure 15:
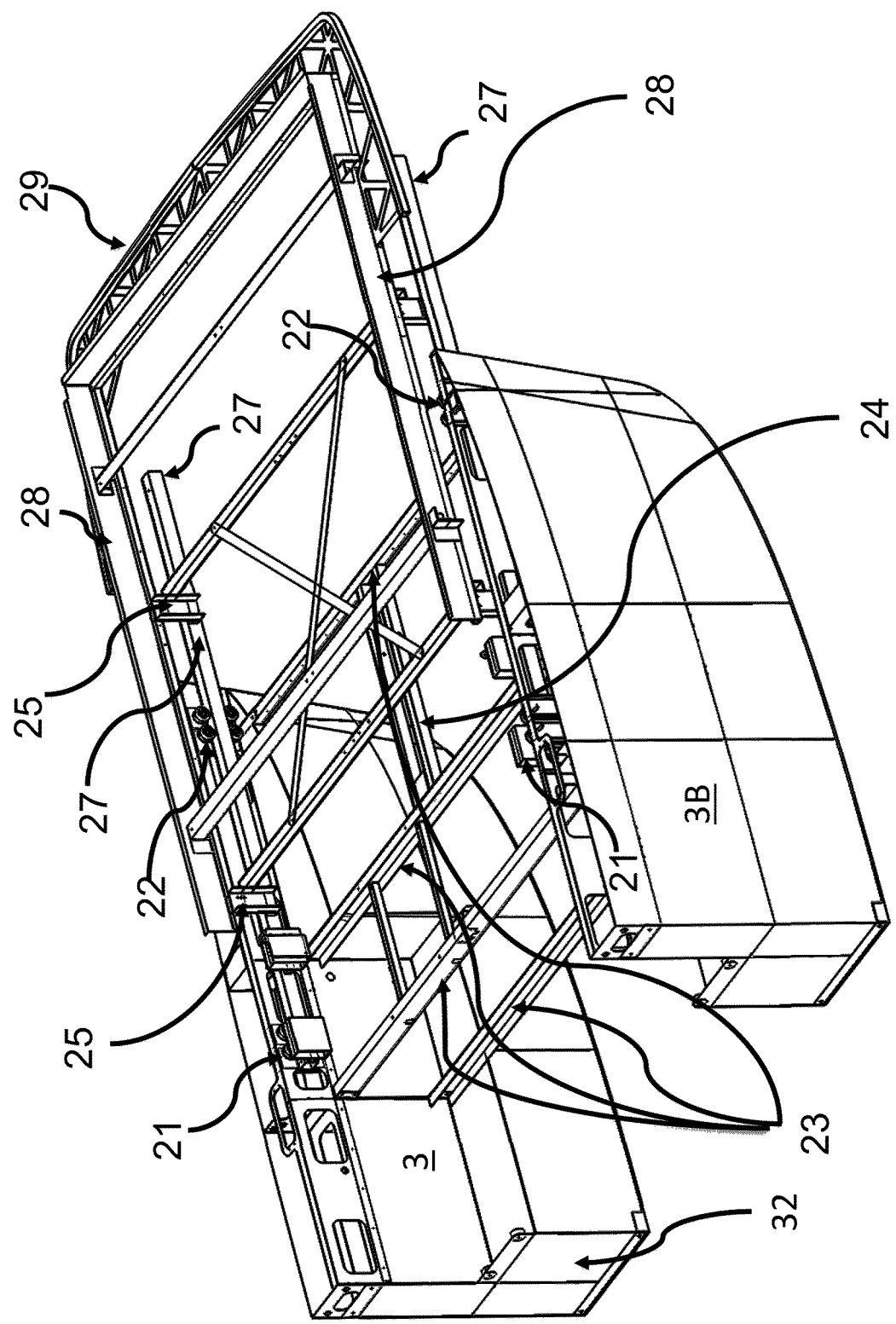
FIG. 15 is a perspective view of an embodiment of a hull assembly of a vessel with a portion of the slide assembly in a deployed position and with at least a portion of the energy harvesting roof in an open position.
Figure 16:
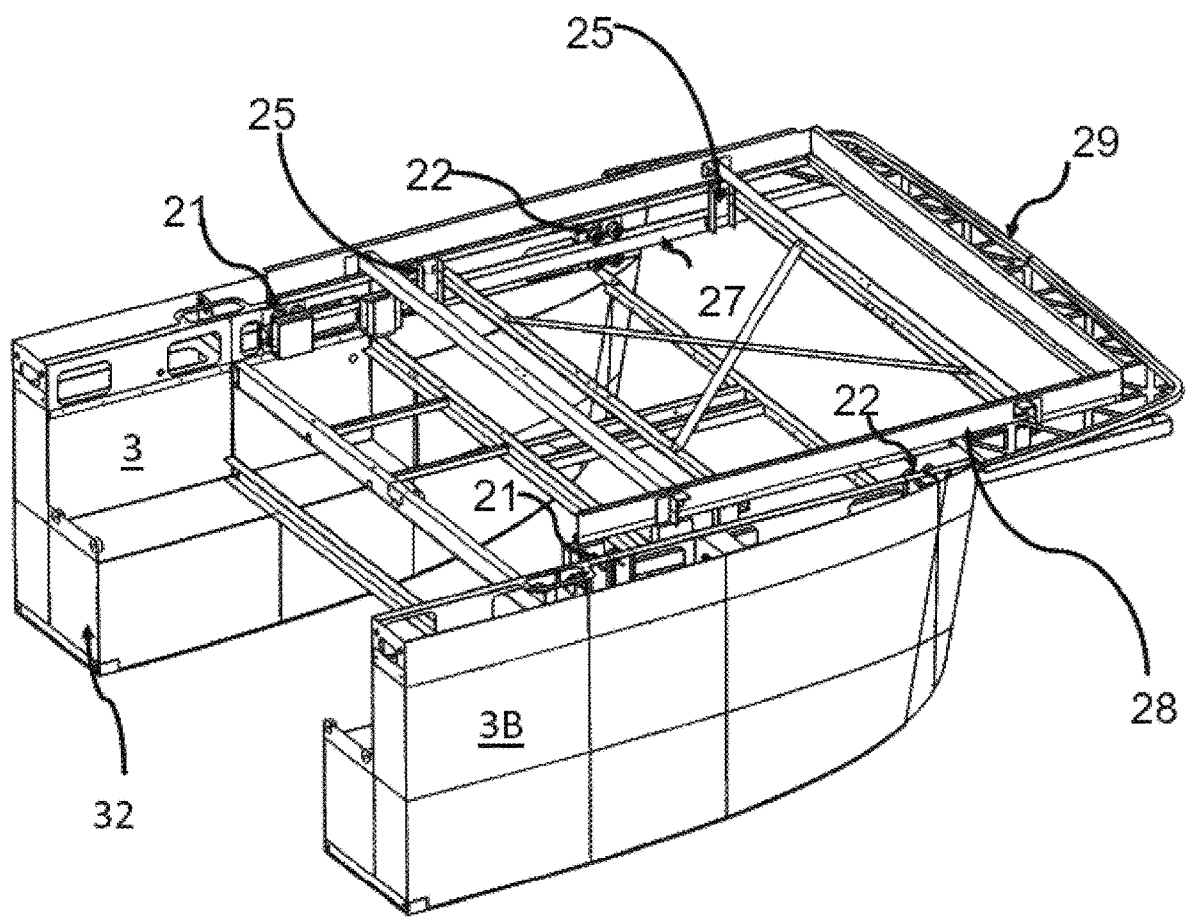
FIG. 16 is a perspective view of an embodiment of a portion of a vessel with the slide assembly in a deployed position and with at least a portion of the energy harvesting roof in a closed position.
Figure 17:
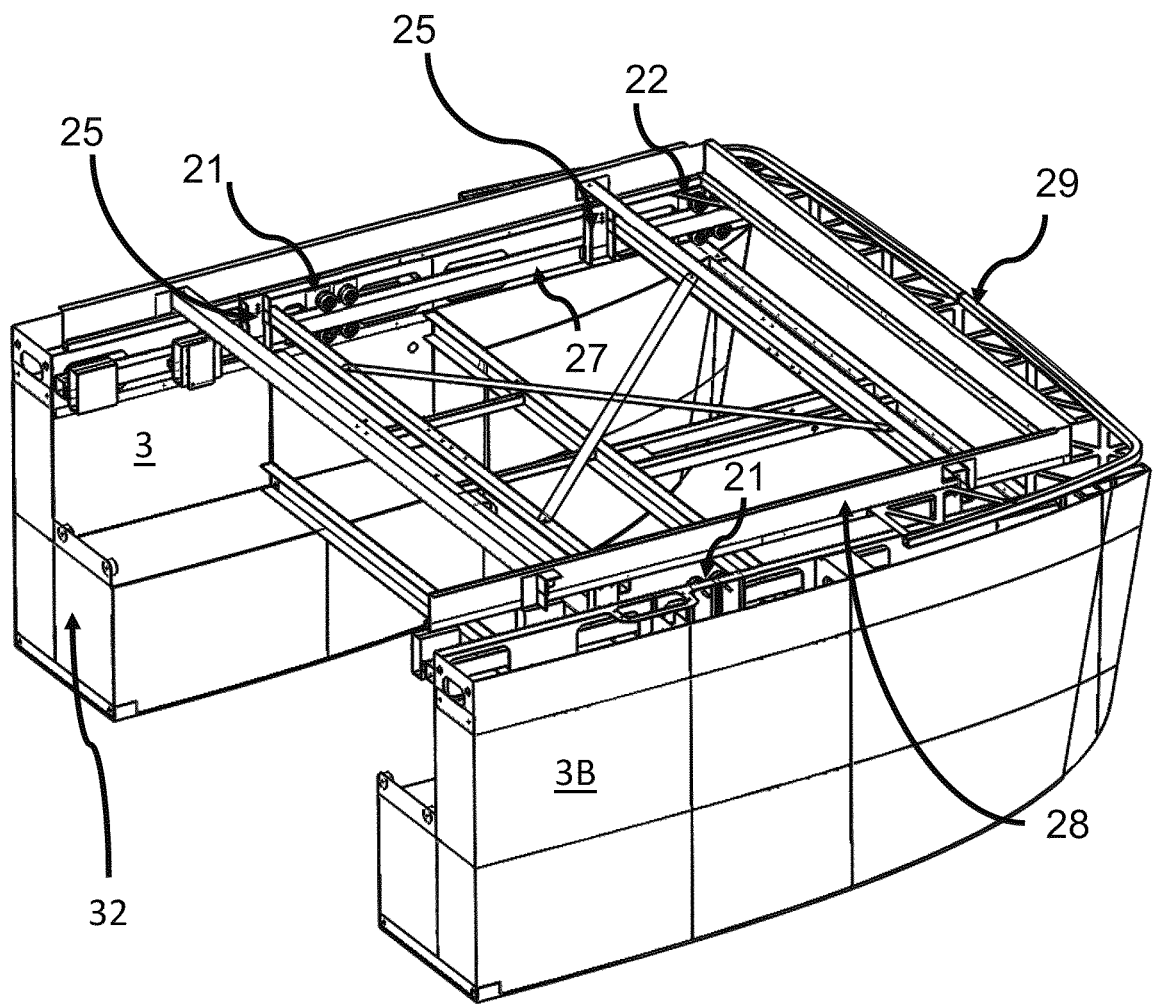
FIG. 17 is a perspective view of an embodiment of a portion of a vessel with the slide assembly in a stowed position and with at least a portion of the energy harvesting roof in a closed position.
Figure 18:
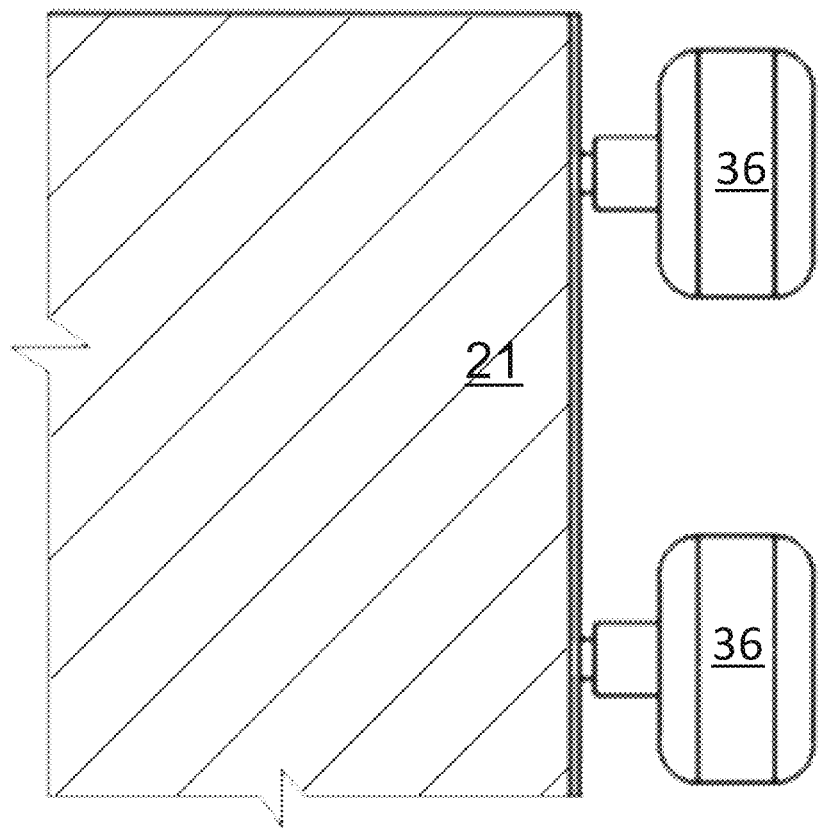
FIG. 18 is a cross-sectional view of an embodiment of roller elements and bearings of a vessel.
Figure 19:
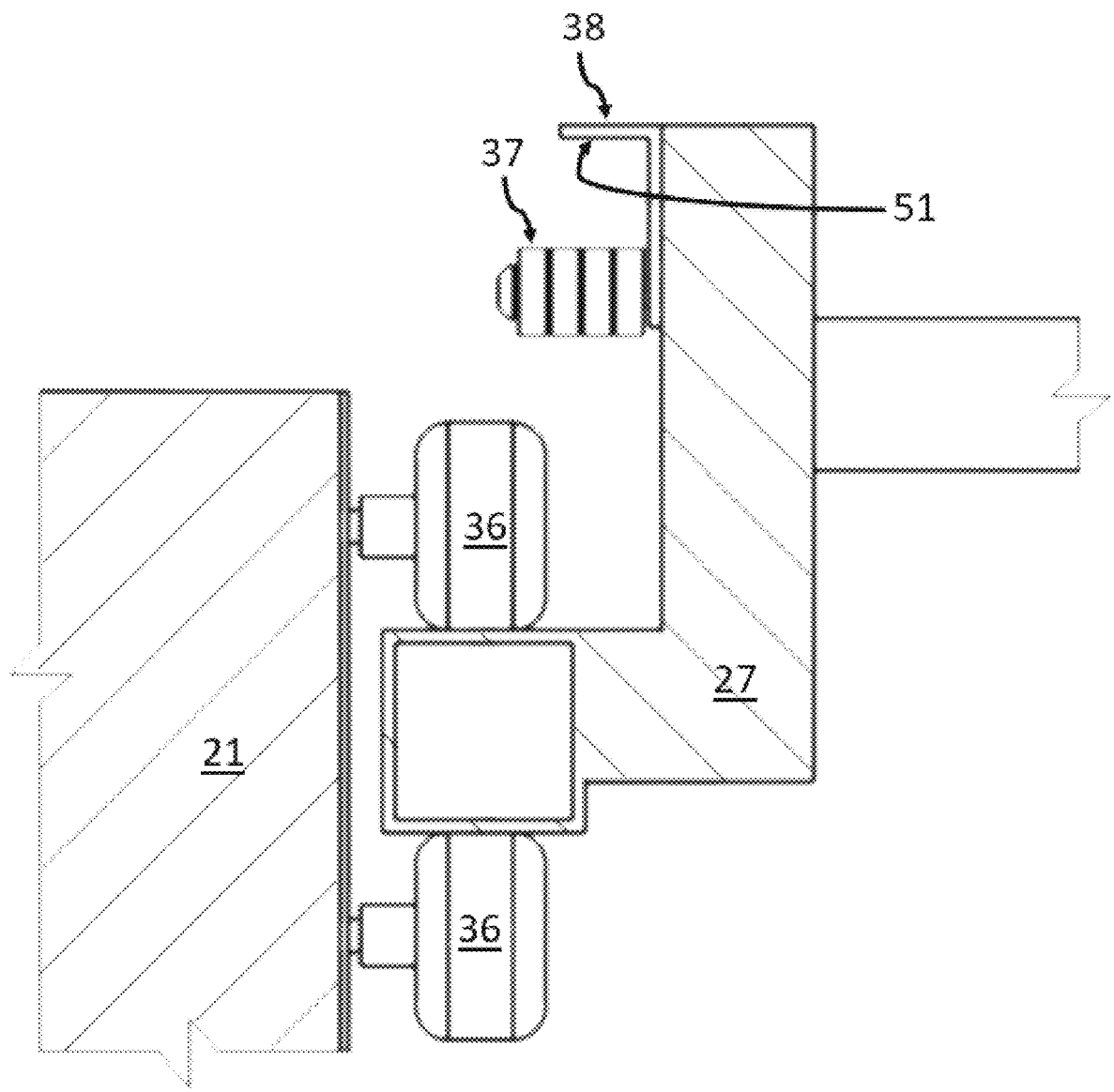
FIG. 19 is a cross-sectional view of an embodiment of roller elements and bearings of a vessel with the lower slide assembly.
Figure 20:
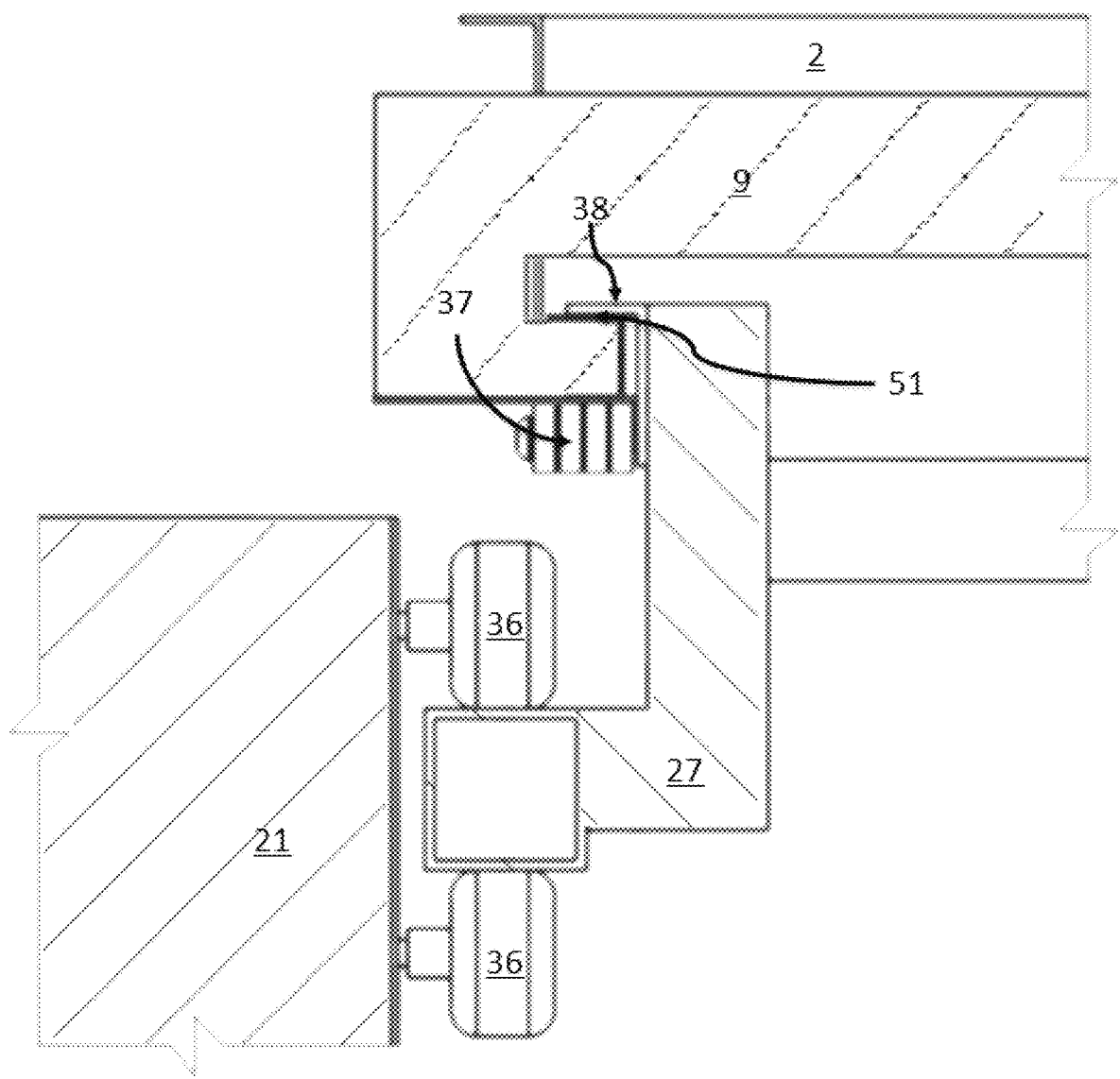
FIG. 20 is a cross-sectional view of an embodiment of roller elements and bearings of a vessel with the lower slide assembly and with the upper slide assembly.
Figure 21:
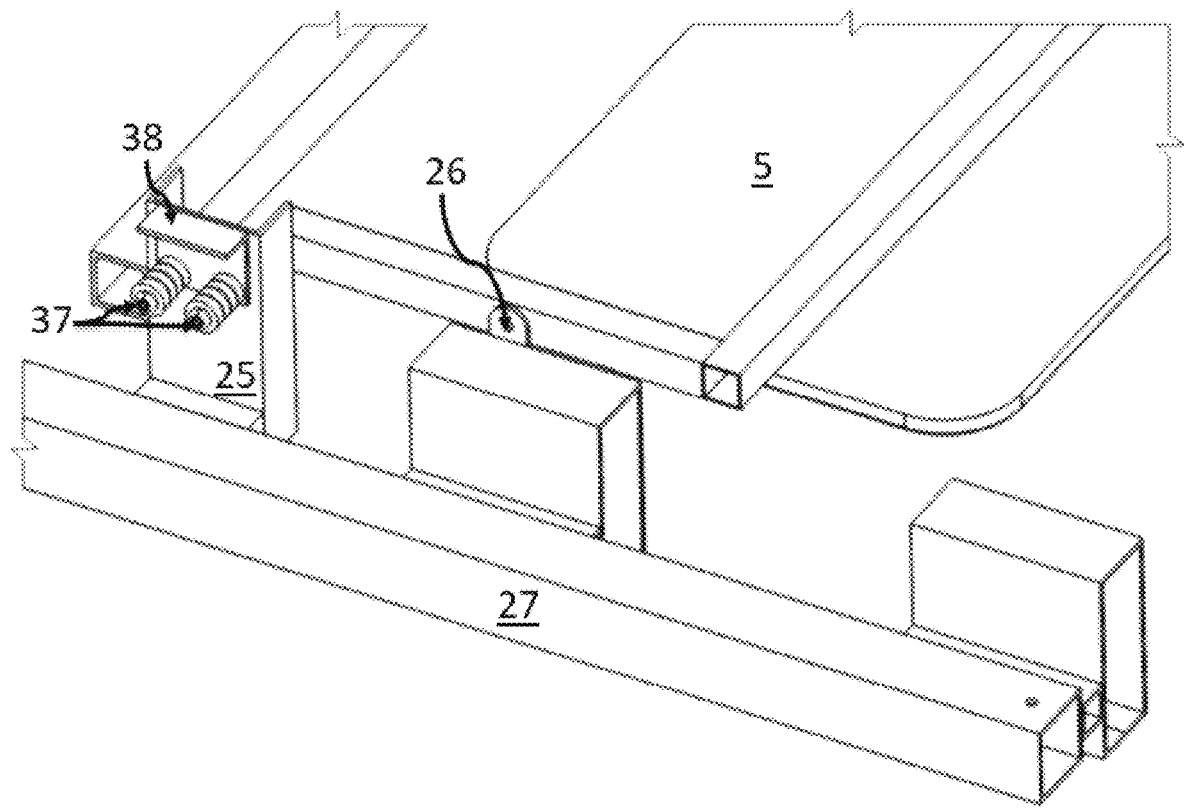
FIG. 21 is a perspective view of an embodiment of the lower slide assembly portion of a vessel with the seat component stowed.
Figure 22:
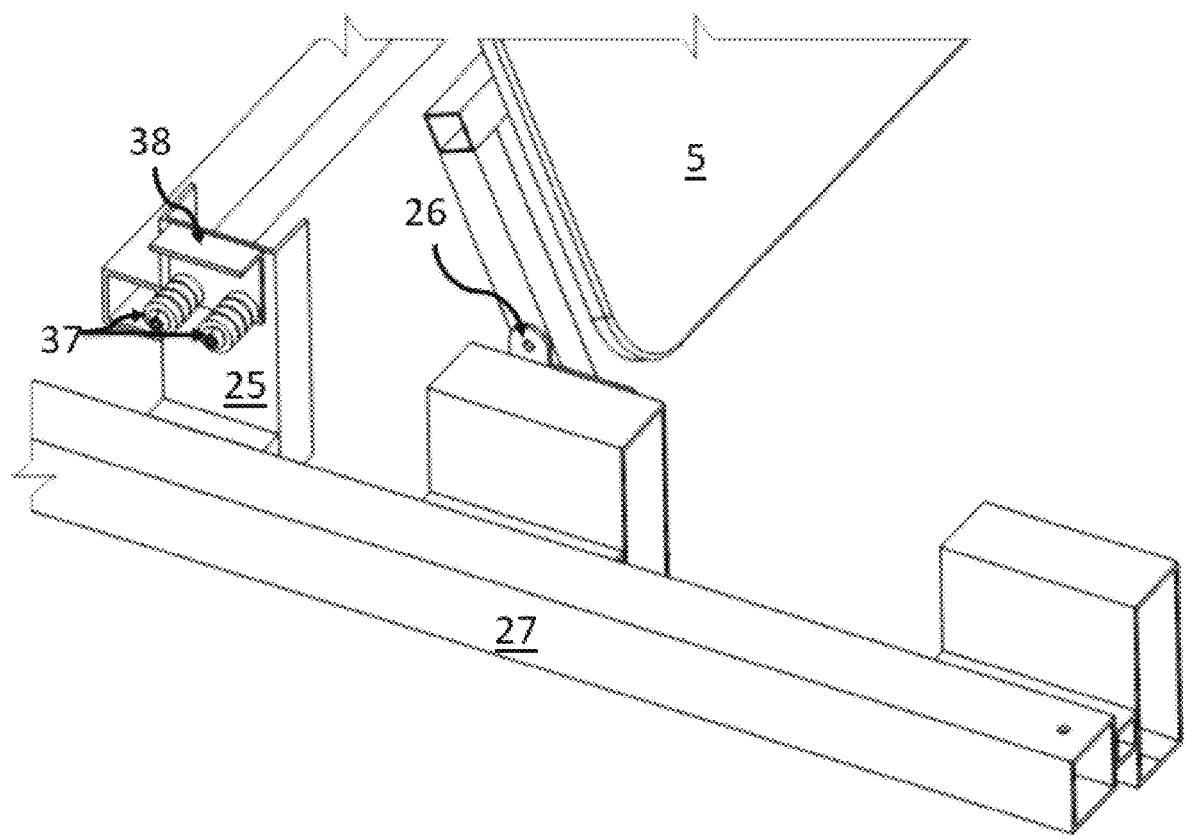
FIG. 22 is a perspective view of an embodiment of the lower slide assembly portion of a vessel with the seat component deployed.

An embodiment of a vessel utilizes the upper slide 17 and lower slide 16 to extend the length of the boat above the waterline, uncovering an interior 10 (optionally including a seating area) that is protected from the elements and secure when closed. For FIGS. 15, 16 and 17, the illustrated elements and element positions may be mirrored about the joining face 32 to present the full embodied hull. FIG. 15 illustrates an embodiment of sliding assemblies coupled to an assembly of the first quarter hull 3 and the second symmetrical quarter hull 3B. As shown in FIG. 15, the upper slide 17 and the lower slide 16 are positioned in their extended positions. The lower slide 16 slides out a predefined distance by means of the lower slide rails 27 within the first roller assemblies 21 and second roller assemblies 22 of both the first quarter hull 3 and the mirrored quarter hull 3A. A view of this arrangement is seen in FIGS. 18, 19 and 20 (for these figures the first roller assembly 21 and second roller assembly 22 are substantially similar and can be interchanged). The upper slide 17 slides out a predefined distance by means of the upper slide rails 28 tracked between the upper roller 37 and the roof slide retainer 38 of each pylon 25 coupled to the lower frame 16. A view of this arrangement is seen in FIG. 20. In FIG. 16, the upper slide 17 is slid back to a stowed position, and the lower slide 16 remains in the extended position. FIG. 17 illustrates a similar embodiment with the upper slide 17 and the lower slide 16 slid back to a stowed position. With the figures described above, it is further conceived that the quarter hulls 3A, 3C (not shown) mirror the illustrated quarter hulls 3, 3B about the joining face 32, elementally and positionally. For example, in some embodiments, as the first upper slide 17 and the first lower slide 16 change position relative to quarter hulls 3, 3B, as illustrated in FIGS. 15, 16 and 17, a second upper slide and a second lower slide, coupled to quarter hulls 3A, 3C, would also change position relative to quarter hulls 3A, 3C, such that the first upper slide 17 and first lower slide 16 mirror a second upper slide and second lower slide. With this said, the embodiment of FIG. 15 is configured to allow for an opened interior 10 and roof 2. While FIG. 17 is configured to have a closed interior 10 and closed roof 2. Although three slide configurations are illustrated, a plurality of intermediate configurations are further contemplated. Further, although two roof sections are shown, one roof section may be employed or a plurality of roof sections. Additionally, on the contact surface 51 which contacts the upper slide rails 28, the roof slide retainer 38 may comprise anti-friction pads, rollers, or any other friction-reducing devices known in the art.

The actuation of the lower slide 16 and upper slide 17 may be accomplished manually or with the use of powered devices. These powered devices may be linear actuators, lead screws coupled to electric motors, or any other suitable devices known in the art.

In some embodiments, optional seat component 5 is attached to the lower slide 16, as seen in FIGS. 8-9 and 21-22. In these embodiments, optional seat component 5 folds down when pressed by the upper slide 17 returning to the stowed position. Additionally, optional seat component 5 folds back to a use-position when the upper slide 17 extends back out. The return of optional seat component 5 to a use position may be manual or automatic with the use of a spring or other suitable device known in the art.

Overall, the various embodiments described herein allow for significantly greater ease-of-use, safety, convenience, quality of experience, and environment sustainability compared to the current state-of-the-art. Much of the description above alludes to the vessel 1 being adapted for users, but further embodiments are contemplated in which the vessel 1 may be adapted for cargo delivery. In these embodiments, the interior 10 may be adapted into a simple cargo area or box. Adapted for cargo coupled with autonomous or remote control, these embodiments become very useful in cargo delivery tasks. Further, many of the embodiments above allude to use configurations including an open roof 2 configuration, but further contemplated embodiments comprise use configurations comprising a closed roof 2 configuration or no roof Once again coupled with autonomous or remote control, the vessel 1 of these embodiments become very useful in transferring payloads, sensors, scientific instruments, etc., in an interior 10, covered or uncovered.

As used in the description and claims, the singular form "a", "an" and "the" include both singular and plural references unless the context clearly dictates otherwise. For example, the term "position" may include, and is contemplated to include, a plurality of positions. At times, the claims and disclosure may include terms such as "a plurality," "one or more," or "at least one;" however, the absence of such terms is not intended to mean, and should not be interpreted to mean, that a plurality is not conceived.

The term "about" or "approximately," when used before a numerical designation or range (e.g., to define a length or pressure), indicates approximations which may vary by (+) or (−) 5%, 1% or 0.1%. All numerical ranges provided herein are inclusive of the stated start and end numbers. The term "substantially" indicates mostly (i.e., greater than 50%) or essentially all of a device, substance, or composition.

As used herein, the term "comprising" or "comprises" is intended to mean that the devices, systems, and methods include the recited elements, and may additionally include any other elements. "Consisting essentially of" shall mean that the devices, systems, and methods include the recited elements and exclude other elements of essential significance to the combination for the stated purpose. Thus, a system or method consisting essentially of the elements as defined herein would not exclude other materials, features, or steps that do not materially affect the basic and novel characteristic(s) of the claimed disclosure. "Consisting of" shall mean that the devices, systems, and methods include the recited elements and exclude anything more than a trivial or inconsequential element or step. Embodiments defined by each of these transitional terms are within the scope of this disclosure.

The examples and illustrations included herein show, by way of illustration and not of limitation, specific embodiments in which the subject matter may be practiced. Other embodiments may be utilized and derived therefrom, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A watercraft comprising:
   a propulsion system;
   a hull comprising:
      a first hull assembly, and
      a second hull assembly opposite the first hull assembly and parallel to the first hull assembly;
   a roof configured to slide along a rail system between an open configuration and a closed configuration;
   an interior between the first hull assembly and the second hull assembly, the interior being accessible when the roof of the hull is in the open configuration and inaccessible when the roof of the hull is in the closed configuration,
   wherein the roof comprises a first roof section and a second roof section that slide apart when in the open configuration and slide together when in the closed configuration;
   a photovoltaic energy harvesting array affixed to the roof to provide power to the propulsion system; and
   a frame configured to couple the first hull assembly to the second hull assembly,
   wherein the first hull assembly comprises a first quarter hull coupled to a second quarter hull, and the second hull assembly comprises a third quarter hull coupled to a fourth quarter hull,
   wherein the first and third quarter hulls are substantially reflectively duplicative of the second and fourth quarter hulls, and
   wherein the first hull assembly is substantially reflectively symmetrical to the second hull assembly.

2. The watercraft of claim 1, wherein each of the first quarter hull, the second quarter hull, the third quarter hull, and the fourth quarter hull comprise an individually sealed buoyancy chamber.

3. The watercraft of claim 1, wherein the roof comprises one or more energy harvesting arrays configured as a power recharging source for the watercraft.

4. The watercraft of claim 1, further comprising a propulsion unit of the propulsion system coupled to the hull.

5. The watercraft of claim 4, further comprising a controller configured to accept inputs and respond with directional and power influences on the propulsion system.

6. The watercraft of claim 1, wherein the hull defines the interior, and wherein the interior comprises one or more seats configured to move between a stowed position when the roof is in the closed configuration and a use position when the roof is in the open configuration.

7. The watercraft of claim 1, wherein the watercraft is autonomous or remotely controlled.

8. A watercraft comprising:
   a propulsion system;
   a hull comprising four quarter hull sections, each configured as a self-contained buoyancy chamber, and each of the four quarter hull sections being substantially symmetrical or reflectively symmetrical;
   a frame configured to couple the four quarter hull sections together;
   a rail system coupled to a top portion of the hull;
   a roof configured to slide along the rail system coupled to the hull, the roof being configured to slide between a closed configuration in which an interior between the hull sections is inaccessible, and an open configuration in which the interior is accessible, wherein the roof comprises a first roof section and a second roof section that slide apart when in the open configuration and slide together when in the closed configuration; and
   a photovoltaic energy harvesting array affixed to the roof to provide power to the propulsion system.

9. The watercraft of claim 8, wherein:
   the four quarter hull sections comprise: a first front quarter hull coupled to a first rear quarter hull, and a second front quarter hull coupled to a second rear quarter hull;
   the first front quarter hull is a substantial duplicate of the second rear quarter hull, and the second front quarter hull is a substantial duplicate of the first rear quarter hull; and
   the first front quarter hull coupled to the first rear quarter hull is substantially reflectively symmetrical to the second front quarter hull coupled to the second rear quarter hull.

10. The watercraft of claim 8, wherein the roof comprises one or more energy harvesting arrays configured as a power recharging source for the watercraft.

11. The watercraft of claim 8, further comprising a propulsion unit of the propulsion system coupled to the hull.

12. The watercraft of claim 11, further comprising a controller configured to accept inputs and respond with directional and power influences on the propulsion unit.

13. The watercraft of claim 12, wherein the propulsion unit is configured to create forces and force direction to cause the watercraft to move one or more of: laterally, bi-directionally, or rotationally based on the inputs from the controller.

14. A watercraft comprising:
   a propulsion system;
   a hull comprising four quarter hulls, each configured as a self-contained buoyancy chamber;
   a frame configured to couple the four quarter hulls together; and
   a first roof section and a second roof section, each configured to slide along a rail system coupled to the hull, wherein the first roof section and the second roof section are configured to slide between a closed configuration in which the first roof section is in contact with the second roof section and an interior between the four quarter hulls is inaccessible, and an open configuration in which the first roof section is set apart from the second roof section and the interior is accessible,
   wherein the first roof section and the second roof section include a photovoltaic energy harvesting array affixed to the roof to provide power to the propulsion system.

15. The watercraft of claim 14, wherein:
the four quarter hulls comprise: a first front quarter hull coupled to a first rear quarter hull, and a second front quarter hull coupled to a second rear quarter hull;
the first front quarter hull is a substantial duplicate of the second rear quarter hull, and the second front quarter hull is a substantial duplicate of the first rear quarter hull; and
the first front quarter hull coupled to the first rear quarter hull is substantially reflectively symmetrical to the second front quarter hull coupled to the second rear quarter hull.

16. The watercraft of claim 14, wherein the first roof section and the second roof section comprise one or more energy harvesting arrays configured as a power recharging source for the watercraft.

17. The watercraft of claim 14, further comprising a first propulsion unit of the propulsion system coupled to the hull.

18. The watercraft of claim 17, further comprising a controller configured to accept inputs and respond with directional and power influences on the first propulsion unit.

19. The watercraft of claim 18, wherein the first propulsion unit is configured to create forces and force direction to cause the watercraft to move one or more of: laterally, bi-directionally, or rotationally based on the inputs from the controller.

20. The watercraft of claim 18, further comprising:
a second propulsion unit of the propulsion system configured to independently respond with directional and power outputs respective to the inputs from the controller, and
wherein both the first propulsion unit and the second propulsion unit are configured to be adjusted between a stowed position and a deployed position.

* * * * *